United States Patent
Chen et al.

(10) Patent No.: US 12,408,137 B2
(45) Date of Patent: Sep. 2, 2025

(54) POSITIONING METHOD AND SYSTEM, AND APPARATUS

(71) Applicant: SHENZHEN YINWANG INTELLIGENT TECHNOLOGIES CO., LTD., Shenzhen (CN)

(72) Inventors: Jun Chen, Beijing (CN); Jianqin Liu, Beijing (CN); Yongbing Lin, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 389 days.

(21) Appl. No.: 17/959,651

(22) Filed: Oct. 4, 2022

(65) Prior Publication Data
US 2023/0040051 A1 Feb. 9, 2023

Related U.S. Application Data

(63) Continuation of application No. PCT/CN2020/083542, filed on Apr. 7, 2020.

(51) Int. Cl.
*H04W 4/40* (2018.01)
*H04W 64/00* (2009.01)

(52) U.S. Cl.
CPC .......... *H04W 64/006* (2013.01); *H04W 4/40* (2018.02)

(58) Field of Classification Search
CPC ............................. H04W 4/40; H04W 64/006
USPC ...................................................... 455/456.1
See application file for complete search history.

(56) References Cited

U.S. PATENT DOCUMENTS

| 2016/0305794 | A1* | 10/2016 | Horita | G06V 20/584 |
| 2018/0239032 | A1* | 8/2018 | Thiel | G01S 19/40 |
| 2019/0050648 | A1* | 2/2019 | Stojanovic | G06V 20/13 |
| 2019/0316915 | A1* | 10/2019 | Koda | G08G 1/0968 |
| 2021/0199814 | A1* | 7/2021 | Jia | G01S 19/45 |

FOREIGN PATENT DOCUMENTS

| CN | 103249142 A | 8/2013 |
| CN | 104657389 A | 5/2015 |
| CN | 105841687 A | 8/2016 |
| CN | 107407725 A | 11/2017 |
| CN | 107643086 A | 1/2018 |

(Continued)

OTHER PUBLICATIONS

Wan et al., "Robust and Precise Vehicle Localization based on Multi-sensor Fusion in Diverse City Scenes," Submitted on Mar. 6, 2020, arXiv:1711.05805v2 [cs.CV], 8 pages.

(Continued)

*Primary Examiner* — Qutbuddin Ghulamali
(74) *Attorney, Agent, or Firm* — Fish & Richardson P.C.

(57) ABSTRACT

The present disclosure relates to positioning methods, systems, and apparatuses. One example method includes receiving, by a server, a first message from a first terminal device, where the first message includes first location information determined by the first terminal device, determining, by the server, a first reference object based on the first location information, and sending, by the server, a second message to the first terminal device, where the second message includes identification information of the first reference object, and the identification information of the first reference object is used by the first terminal device to update the first location information.

30 Claims, 9 Drawing Sheets

(56) References Cited

FOREIGN PATENT DOCUMENTS

| | | |
|---|---|---|
| CN | 108051836 A | 5/2018 |
| CN | 110719570 A | 1/2020 |

OTHER PUBLICATIONS

Office Action in Chinese Appln. No. 202080004872.9, dated Mar. 15, 2022, 6 pages (with English translation).
Extended European Search Report in European Appln No. 20930186.0, dated Apr. 6, 2023, 9 pages.
International Search Report and Written Opinion in International Appln. No. PCT/CN2020/083542, mailed on Jan. 11, 2021, 20 pages (with English translation).

* cited by examiner

| Number 1 | Attribute feature 1 | Measured value 1 | Matching parameter 1 | Attribute feature 2 | Measured value 2 | Matching parameter 2 | Number 2 | Attribute feature 3 | Measured value 3 |

- First group of basic units: Attribute feature 1, Measured value 1
- Second group of basic units: Attribute feature 2, Measured value 2
- Third group of basic units: Attribute feature 3, Measured value 3
- First group of advanced units
- Second group of advanced units

FIG. 4

POSITIONING METHOD AND SYSTEM, AND APPARATUS

CROSS-REFERENCE TO RELATED APPLICATIONS

This application is a continuation of International Application No. PCT/CN2020/083542, filed on Apr. 7, 2020, the disclosure of which is hereby incorporated by reference in its entirety.

TECHNICAL FIELD

This application relates to the field of intelligent vehicles, and in particular, to a positioning method and system, and an apparatus.

BACKGROUND

With continuous development of internet technologies and manufacturing technologies, emerging applications such as autonomous driving vehicles are emerging. The so-called autonomous driving vehicle is an intelligent vehicle that senses a road environment by using an in-vehicle sensor system, automatically plans a driving route, and controls the vehicle to reach a predetermined target. Vehicle positioning is one of main technologies through which the autonomous driving vehicle can be implemented. Vehicle positioning precision directly affects whether the autonomous driving vehicle can be applied to an actual traffic scenario. Therefore, how to ensure vehicle positioning precision has currently become a hot research topic.

In the conventional technology, positioning based on a satellite signal (for example, positioning based on a global positioning system), dead reckoning positioning based on an inertial measurement unit (inertial measurement unit, IMU), and feature matching-based positioning based on a laser radar (laser radar) or a visual sensor are usually combined to implement a high-precision positioning function. Herein, feature matching-based positioning based on the laser radar or the visual sensor means that a vehicle collects attribute feature values of reference objects around the vehicle by using the laser radar or the visual sensor, then compares the attribute feature values of the reference objects with attribute feature reference values that are of the reference objects and that are provided by a high-precision map, and then estimates current location information of the vehicle based on location information that is of some reference objects and that is obtained through the comparison. However, because the reference object may be dirty, aged, or incomplete, or may be blocked by an obstacle such as a nearby building or a signpost, the vehicle may easily fail to measure or collect an accurate attribute feature value of the reference object, and consequently a feature matching-based positioning method is invalid or positioning precision is reduced. As a result, a vehicle positioning function of the vehicle cannot provide precise location information, and it is difficult to ensure safe and smooth autonomous driving.

SUMMARY

This application provides a positioning method and system, and an apparatus. According to the solution provided in this application, positioning precision of a first terminal device can be improved.

It should be noted that the method provided in the embodiments of this application may be performed by a computing device, and the computing device is a device that can be abstracted as a computer system. A computing device that supports a wireless communication function may be referred to as a wireless communications apparatus. The wireless communications apparatus may be the entire computing device, or may be a part of the computing device, for example, a chip related to the wireless communication function, for example, a system chip or a communications chip. The system chip is also referred to as a system on chip, or is referred to as an SoC chip. Specifically, the wireless communications apparatus may be a terminal such as an intelligent vehicle, a telematics box (telematics box, T-box) in an intelligent vehicle, or a server, or may be an SoC chip or a communications chip that can be disposed in a terminal. The communications chip may include a radio frequency processing chip and a baseband processing chip. The baseband processing chip is also sometimes referred to as a modem (modem). In physical implementation, the communications chip may be integrated into the SoC chip, or may not be integrated into the SoC chip. For example, the baseband processing chip is integrated into the SoC chip, and the radio frequency processing chip is not integrated into the SoC chip.

In the embodiments of this application, the first terminal device may be an intelligent vehicle or an in-vehicle system, for example, a T-box, in an intelligent vehicle. The server may be a local server or a cloud server that has a high-precision map service function.

According to a first aspect, an embodiment of this application provides a positioning method. The positioning method includes: A server receives a first message from a first terminal device, where the first message includes first location information determined by the first terminal device. The server determines a first reference object based on the first location information. The server sends a second message to the first terminal device, where the second message includes identification information of the first reference object, and the identification information of the first reference object is used by the first terminal device to update the first location information.

In this embodiment of this application, the server may select an applicable first reference object for the first terminal device and push the applicable first reference object to the first terminal device, to resolve a problem of low positioning precision caused by using a damaged or blocked reference object by the first terminal device, so that positioning precision of the first terminal device is improved.

With reference to the first aspect, in a possible implementation, the server may determine, based on the first location information, a second reference object from a first map currently used by the server. Then, the server determines the first reference object from the second reference object based on a matching parameter of at least one attribute feature of the second reference object, where the matching parameter of the at least one attribute feature of the second reference object may be stored in the server, or may be obtained by the server through a network, and the matching parameter of the attribute feature is used to indicate a matching degree between a measured value of the attribute feature and a reference value of the any attribute feature. In a scenario in which the first terminal device is an intelligent vehicle, when some reference objects are damaged or blocked, measured values of attribute features of the reference objects are greatly different from reference values of the attribute features of the reference objects, and therefore these reference objects are no longer applicable to feature matching-based positioning performed by the intelligent vehicle. Therefore, the server may accurately screen reference objects by using matching parameters of the attribute features of the reference objects, so that a proper and reliable reference object can be obtained for the intelligent vehicle to perform positioning, and positioning precision of the intelligent vehicle can be improved.

With reference to the first aspect, in a possible implementation, it is assumed that there are N2 second reference objects and N1 first reference objects. The server may calculate, based on a matching parameter that is of each of at least one attribute feature of each of the N2 second reference objects and that is stored in the server, a combination matching parameter corresponding to each second reference object, where one second reference object corresponds to one combination matching parameter. The server determines the N1 first reference objects from the N2 second reference objects based on the combination matching parameter corresponding to each second reference object. In this embodiment of this application, N1 and N2 are positive integers, and N2 is greater than or equal to N1. The server calculates one corresponding combination matching parameter for each reference object, and then determines the N1 first reference objects based on the combination matching parameter corresponding to each second reference object. The method is simple and is easily implemented, and can reduce a data processing amount of the server.

With reference to the first aspect, in a possible implementation, it is assumed that there are N2 second reference objects and N1 first reference objects. The server may first determine, based on a matching parameter of each of at least one attribute feature of each of the N2 second reference objects, a combination matching parameter corresponding to each second reference object. Then, the server selects the N1 first reference objects from the N2 second reference objects based on the combination matching parameter corresponding to each second reference object and a measured value of at least one target attribute feature of each second reference object, where the target attribute feature may be determined based on one or more attribute features of each reference object. Herein, the server performs secondary screening on the N2 reference objects by using the combination matching parameter and a measured value of a preset target attribute feature, so that a damaged or blocked reference object can be removed more accurately, and therefore a more proper reference object can be determined as the first reference object of the first terminal device.

With reference to the first aspect, in a possible implementation, the first message further includes a third reference object determined by the first terminal device based on the first location information and/or environment information of the first terminal device. The server determines the first reference object based on a second reference object and the third reference object, where the second reference object is determined by the server from a first map based on the first location information, and the first map is a map currently used by the server. The server comprehensively considers the third reference object provided by the first terminal device and the second reference object selected, based on the location information reported by the first terminal device, by the server from the map currently used by the server, to ensure that the selected first reference object is a newly marked reference object on the current map, and can also be correctly detected by the first terminal device, so that rationality and reliability of the first reference object determined by the server can be ensured.

With reference to the first aspect, in a possible implementation, the first message further includes map version information of the first terminal device. The server determines the first reference object based on a second reference object and a third reference object, where the second reference object is determined by the server from a first map based on the first location information, and the first map is a map currently used by the server; and the third reference object is determined by the server from a second map based on the first location information, and the second map is a map corresponding to the map version information. Herein, the first reference object is a reference object that exists in both the second reference object and the third reference object, or the first reference object is a reference object that exists in both the second reference object and the third reference object and for which a corresponding matching parameter is relatively large. The map version information may be specifically a version number, a software serial number, vendor information, or the like of a map. This is not specifically limited in this application. The second map may be determined, based on the map version information, by the server from one or more versions of maps stored in the server. Herein, the first terminal device needs to send only the first location information and the map version information to the server. In this way, a signaling structure of the first message can be simplified, and overheads of signaling between the server and the first terminal device can be reduced.

With reference to the first aspect, in a possible implementation, the first message further includes map version information of the first terminal device. The server determines the first reference object from a second map based on the first location information, where the second map is a map corresponding to the map version information. Herein, the server may select, based on the first location information, a reference object for the first terminal device from the second map currently used by the first terminal device. The method is simple and is easily implemented, and can reduce a data processing amount of the first terminal device and improve a data processing capability of the first terminal device.

With reference to the first aspect, in a possible implementation, the first message further includes environment information of the first terminal device. The server determines the first reference object from a first map and the environment information based on the first location information, where the first map is a map currently used by the server. Herein, the server determines the first reference object from the first map based on the environment information of the first terminal device and the first location information of the first terminal device, to ensure that the first reference object determined by the server is a newly marked reference object on the current map, and can also be fully detected by the first terminal device, so that rationality and reliability of the determined first reference object can be ensured.

With reference to the first aspect, in a possible implementation, the second message further includes a measured value and/or a matching parameter of at least one attribute feature of the first reference object, and the measured value and/or the matching parameter of the at least one attribute feature of the first reference object are/is used by the first terminal device to update the first location information.

With reference to the first aspect, in a possible implementation, the second message further includes application scope indication information, and the application scope indication information is used to indicate a preset geographical scope to which the second message is applicable.

With reference to the first aspect, in a possible implementation, the application scope indication information is determined by the server based on a load of the server. Herein, the load of the server is a parameter used to indicate a busy degree of the server, for example, a quantity of processes being processed by the server or a quantity of terminal devices currently connected to the server. This is not specifically limited in this application. A heavier load of the server indicates a busier server. In this implementation, a heavier load of the server indicates a larger preset geographical scope to which a reference object configuration message indicated by target indication information determined by the server is applicable. An application scope of the second message is identified, so that when the load of the server is heavy, the server sends a second message with a large application scope, and when the load of the server is light, the server sends a second message with a small application scope. Therefore, when the load of the server is heavy, the server does not need to send different second messages to different first terminal devices, so that load of the server can be reduced, and load balancing of the server can be ensured.

With reference to the first aspect, in a possible implementation, the server receives a feature reporting message from a second terminal device, where the feature reporting message includes a measured value and/or a matching parameter of at least one attribute feature of a fourth reference object. The server updates a stored measured value and/or a stored matching parameter of the at least one attribute feature of the fourth reference object based on the measured value and/or the matching parameter of the at least one attribute feature of the fourth reference object. The server updates, based on the measured value and/or the matching parameter that are/is of the attribute feature of the reference object and that are/is reported by the second terminal device, the measured value and/or the matching parameter that are/is of the attribute feature of the reference object and that are/is stored in the server, so that reliability of the data stored in the server can be ensured.

With reference to the first aspect, in a possible implementation, the server may further send a feature query message to the second terminal device, where the feature query message includes the at least one attribute feature of the fourth reference object.

With reference to the first aspect, the feature query message further includes reporting manner indication information corresponding to each of the at least one attribute feature, and reporting manner indication information corresponding to any attribute feature is used to indicate a reporting manner of the any attribute feature.

With reference to the first aspect, in a possible implementation, the reporting manners include periodic reporting and aperiodic reporting. Optionally, a reporting manner corresponding to an attribute feature with a larger stability parameter is aperiodic reporting, and a reporting manner corresponding to an attribute feature with a smaller stability parameter is periodic reporting. Herein, a reporting manner of a measured value and/or a matching parameter of an attribute feature is determined based on a value of a stability parameter of the attribute feature, so that the second terminal device can be prevented from frequently reporting measured values and/or matching parameters of some relatively stable attribute features, signaling interaction between the server and the second terminal device can be reduced, and communication load between the server and the second terminal device can be reduced.

According to a second aspect, an embodiment of this application provides a positioning method. A first terminal device sends a first message to a server, where the first message includes first location information of the first terminal device. The first terminal device receives a second message from the server, where the second message includes identification information of a first reference object, and the first reference object is determined by the server based on the first location information. The first terminal device updates the first location information based on the identification information of the first reference object.

In this embodiment of this application, the first terminal device may perform positioning by using an applicable first reference object selected by the server, to avoid a problem of low positioning precision caused by performing positioning by using an inapplicable reference object such as a damaged or blocked reference object, so that positioning precision of the first terminal device can be improved.

With reference to the second aspect, in a possible implementation, the first message further includes map version information of the first terminal device, and the map version information is used by the server to determine the first reference object.

With reference to the second aspect, in a possible implementation, the first message further includes a third reference object, the third reference object is determined by the first terminal device based on the first location information or environment information of the first terminal device, and the third reference object is used by the server to determine the first reference object.

With reference to the second aspect, in a possible implementation, the first message further includes environment information of the first terminal device, and the environment information is used by the server to determine the first reference object.

With reference to the second aspect, in a possible implementation, the second message further includes a measured value and/or a matching parameter of at least one attribute feature of the first reference object. The first terminal device determines a fifth reference object based on the first reference object and the measured value and/or the matching parameter of the at least one attribute feature of the first reference object. The first terminal device updates the first location information based on the fifth reference object.

According to a third aspect, an embodiment of this application provides a positioning method. A second terminal device generates a feature reporting message, where the feature reporting message includes a measured value and/or a matching parameter of at least one attribute feature of a fourth reference object, a matching parameter of any attribute feature is used to indicate a matching degree between a measured value of the any attribute feature and a reference value of the any attribute feature, and the measured value and/or the matching parameter of the at least one attribute feature of the fourth reference object are/is used to update a measured value and/or a matching parameter that are/is of the at least one attribute feature of the fourth reference object and that are/is stored in a server. The second terminal device sends the feature reporting message to the server.

In this embodiment of this application, the second terminal device can send measured values and matching parameters of some attribute features of the reference object to the server by using the feature reporting message, so that the server can update, in a timely manner, a measured value and a reference value that are of the attribute feature of the reference object and that are stored in a database of the server. Therefore, reliability and applicability of the measured value and the reference value that are of the attribute feature of the reference object and that are stored in the server are ensured.

With reference to the third aspect, in a possible implementation, the second terminal device obtains a measured value of each of the at least one attribute feature of the fourth reference object. The second terminal device calculates a matching parameter of each attribute feature based on the measured value of each attribute feature and a reference value of each attribute feature.

With reference to the third aspect, in a possible implementation, the second terminal device receives a feature query message from the server, where the feature query message includes the at least one attribute feature of the fourth reference object.

With reference to the third aspect, in a possible implementation, the feature query message further includes reporting manner indication information corresponding to each of the at least one attribute feature of the fourth reference object, and reporting manner indication information corresponding to any attribute feature is used to indicate a reporting manner of the any attribute feature.

With reference to the third aspect, in a possible implementation, the reporting manners include periodic reporting and aperiodic reporting. Optionally, a reporting manner corresponding to an attribute feature with a larger stability parameter is aperiodic reporting, and a reporting manner corresponding to an attribute feature with a smaller stability parameter is periodic reporting.

According to a fourth aspect, an embodiment of this application provides an apparatus. The apparatus may be a server, or may be an element or a module such as a chip inside a server. The apparatus includes units configured to perform the positioning method according to any possible implementation of the first aspect. Therefore, the apparatus can also implement beneficial effects (or advantages) of the positioning method according to the first aspect.

According to a fifth aspect, an embodiment of this application provides an apparatus. The apparatus may be a first terminal device, or may be an element or a module such as a chip inside a first terminal device. The apparatus includes units configured to perform the positioning method according to any possible implementation of the second aspect. Therefore, the apparatus can also implement beneficial effects (or advantages) of the positioning method according to the second aspect.

According to a sixth aspect, an embodiment of this application provides an apparatus. The apparatus may be a second terminal device, or may be an element or a module such as a chip inside a second terminal device. The apparatus includes units configured to perform the positioning method according to any possible implementation of the third aspect. Therefore, the apparatus can also implement beneficial effects (or advantages) of the positioning method according to the third aspect.

According to a seventh aspect, an embodiment of this application provides an apparatus. The apparatus may be a server. The apparatus includes at least one memory and a processor. The processor is configured to invoke code stored in the memory, to perform the positioning method according to any possible implementation of the first aspect.

According to an eighth aspect, an embodiment of this application provides an apparatus. The apparatus may be a first terminal device. The apparatus includes at least one memory and a processor. The processor is configured to invoke code stored in the memory, to perform the positioning method according to any possible implementation of the second aspect.

According to a ninth aspect, an embodiment of this application provides an apparatus. The apparatus may be a second terminal device. The apparatus includes at least one memory and a processor. The processor is configured to invoke code stored in the memory, to perform the positioning method according to any possible implementation of the third aspect.

According to a tenth aspect, an embodiment of this application provides a chip. The chip includes at least one processor and an interface circuit. The interface circuit is configured to: receive code instructions and transmit the code instructions to the processor. The processor is configured to run the code instructions to implement the positioning method according to any one of the first aspect, the second aspect, the third aspect, or the possible implementations of the first aspect, the second aspect, or the third aspect, and therefore can also implement beneficial effects (or advantages) of the positioning method according to any one of the first aspect, the second aspect, the third aspect, or the possible implementations of the first aspect, the second aspect, or the third aspect.

According to an eleventh aspect, an embodiment of this application provides a computer readable storage medium. The computer readable storage medium stores instructions, and the instructions are on a computer to implement the positioning method according to any one of the solutions or the possible implementations of the first aspect, the second aspect, or the third aspect, and therefore can also implement beneficial effects (or advantages) of the positioning method according to the first aspect, the second aspect, or the third aspect.

According to a twelfth aspect, an embodiment of this application provides a computer program product including instructions. When the computer program product runs on a computer, the computer is enabled to perform the positioning method according to any one of the solutions of the first aspect, the second aspect, or the third aspect or any one of the possible implementations of the first aspect, the second aspect, or the third aspect, and therefore can also implement beneficial effects of the positioning method according to the first aspect, the second aspect, or the third aspect According to a thirteenth aspect, an embodiment of this application provides a positioning system. The positioning system includes the server according to the first aspect, the first terminal device according to any one of the second aspect or the possible implementations of the second aspect, and/or the second terminal device according to any one of the third aspect or the possible implementations of the third aspect.

According to the method provided in the embodiments of this application, the server may select an applicable first reference object for the first terminal device based on the first location information of the first terminal device, and push the applicable first reference object to the first terminal device, so that the first terminal device can subsequently perform positioning by using the applicable first reference object. In this way, this can resolve as much as possible a problem of a large positioning error caused by performing positioning by the first terminal device by using an inapplicable reference object such as a damaged or blocked reference object, so that positioning precision of the first terminal device can be improved.

BRIEF DESCRIPTION OF DRAWINGS

FIG. 4 is a schematic structural diagram of a second message according to an embodiment of this application;

DESCRIPTION OF EMBODIMENTS

The following describes technical solutions of this application with reference to the accompanying drawings.

Figure 1:
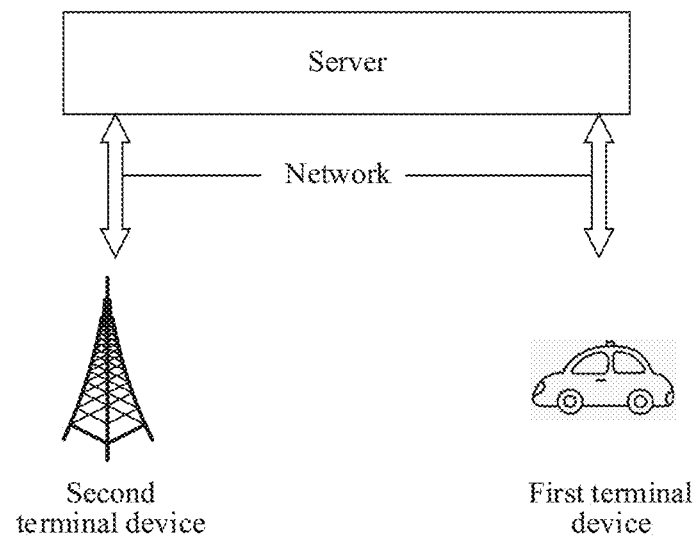
FIG. 1 is a schematic architectural diagram of a positioning system according to an embodiment of this application.

FIG. 1 is a schematic architectural diagram of a positioning system according to an embodiment of this application. A positioning method provided in the embodiments of this application is applicable to the positioning system. It can be learned from FIG. 1 that the positioning system includes a server, a first terminal device, and a second terminal device. The server communicates with the first terminal device and the second terminal device through a network. The network may be constructed based on a long term evolution (long term evolution, LTE) system, a universal mobile telecommunications system (universal mobile telecommunication system, UMTS), a worldwide interoperability for microwave access (worldwide interoperability for microwave access, WiMAX) communications system, a 5th generation (5th generation, 5G) system, a new radio (new radio, NR) system, or the like. This is not specifically limited in this application. The server may be a local server or a cloud server of map software used by the first terminal device, and the server has a high-precision map service function. In actual application, the first terminal device may be an intelligent vehicle or an in-vehicle system in an intelligent vehicle. Herein, the intelligent vehicles include various vehicles. The in-vehicle system in the intelligent vehicle may include in-vehicle software (that is, a computing platform) and hardware (for example, a camera, radar, and a processing chip). The first terminal device accesses the server through the network, to obtain high-precision map data provided by the server. In addition, the first terminal device may further collect an attribute feature value of a reference object around the first terminal device by using the camera, the radar, or the like, and further implement feature matching-based positioning based on the high-precision map data and the attribute feature value of the reference object around the first terminal device, to determine location information of the first terminal device. The second terminal device is mainly a device configured to provide the server with measured values and/or matching parameters of attribute features of various different reference objects. In a specific implementation, the second terminal device may be the first terminal device, or may be a device, such as a road side unit (road side unit, RSU) or a street probe, that can detect and report an attribute feature value of a reference object. This is not specifically limited in this application.

In actual application, the first terminal device usually collects measured values of attribute features of reference objects around the first terminal device by using a sensor such as a laser radar or a visual sensor, compares the measured values of the attribute features of the reference objects with reference values that are of the attribute features of the reference objects and that are provided by a high-precision map, and then estimates current location information of the first terminal device based on location information that is of some reference objects and that is obtained after the comparison succeeds. Further, the first terminal device may also merge the location information estimated by the first terminal device and location information obtained by performing positioning based on a satellite signal or performing dead reckoning positioning based on an inertial measurement unit by the first terminal device, to obtain more accurate positioning information. However, because the reference object may be dirty, aged, or incomplete, or may be blocked by an obstacle such as a nearby building or a signpost, the first terminal device may easily fail to measure or collect an accurate feature observation value of the reference object, and consequently a feature matching-based positioning method is invalid or positioning precision is reduced. Consequently, the first terminal device cannot obtain accurate location information, and it is difficult to ensure safe and smooth autonomous driving.

Therefore, a main technical problem to be resolved in the embodiments of this application is how to exclude a damaged or blocked reference object, to resolve a problem that positioning precision of the first terminal device is low because the reference object is inapplicable, so as to improve positioning precision of the first terminal device.

Embodiment 1

Figure 2:
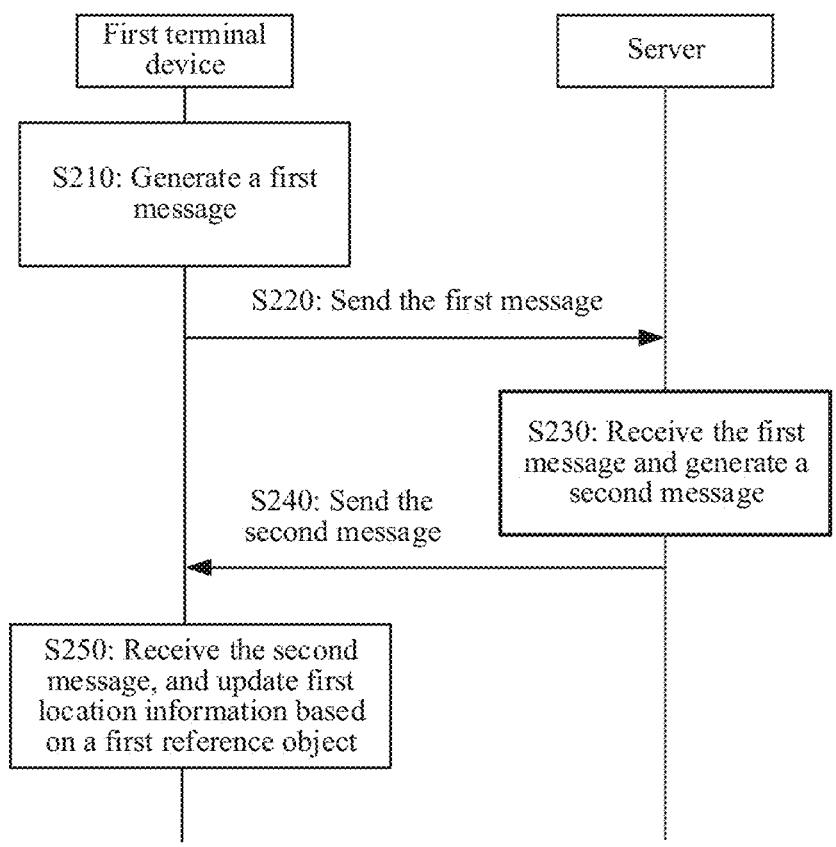
FIG. 2 is a schematic flowchart of a positioning method according to an embodiment of this application.

FIG. 2 is a schematic flowchart of a positioning method according to an embodiment of this application. The positioning method is applicable to the positioning system shown in FIG. 1. It can be learned from FIG. 2 that the method includes the following steps.

S210: A first terminal device generates a first message.

In some possible implementations, when the first terminal device determines that a positioning function needs to be performed, the first terminal device may generate a first message. The first message is mainly used to request a server to provide the first terminal device with an applicable reference object. Herein, the so-called reference object is an object, around the first terminal device, that can provide a reference location for the first terminal device to assist the first terminal device in performing a positioning function, for example, a landmark building, a traffic light, or a billboard around the first terminal device.

In a specific implementation, the first message includes at least one piece of location information (for ease of differentiation, the location information is replaced with first location information below for description). The first location information may include one or more of longitude, latitude, or an administrative region identifier (for example, a cell name or a street name) of a current location of the first terminal device. This is not specifically limited in this application. The first location information may be location information obtained when the first terminal device last performs the positioning function, or may be location information obtained when the first terminal device merges a plurality of positioning results obtained when the first terminal device last performs the positioning function for a plurality of times. This is not specifically limited in this application.

In an optional implementation, the first message may further include identification information of a third reference object. It should be noted herein that in this embodiment of this application, there may be one or more third reference objects. For ease of understanding, it is assumed that there are N3 third reference objects below. Herein, N3 is a positive integer. In a specific implementation, the N3 reference objects may be determined by the first terminal device based on the first location information and/or current environment information obtained by the first terminal device. Herein, the environment information may be information, such as an image or a video, collected by the first terminal device from an environment around the first terminal device by using a sensor unit such as a camera or a laser radar. In a specific implementation, after obtaining the first location information, the first terminal device may determine, by using a geographical location indicated by the first location information as a center of a circle and using a first preset distance as a radius, a first region from a map (for ease of differentiation, the map is replaced with a second map below for description) currently used by the first terminal device. Then, the first terminal device may determine marked reference objects in the first region as the third reference objects, to obtain the N3 third reference objects. Alternatively, the first terminal device may directly extract the N3 third reference objects from the environment information by using an algorithm such as object detection. Alternatively, the first terminal device may perform feature matching between one or more reference objects determined by the first terminal device by using the first location information and one or more reference objects detected by the first terminal device from the environment information, and use a reference object obtained after the matching succeeds as the third reference object. Certainly, the first terminal device may alternatively determine the N3 third reference objects by using another method. This is not specifically limited in this application.

In another optional implementation, the first message may further include the environment information. Herein, for descriptions of the environment information, refer to the foregoing descriptions. Details are not described herein again.

In still another optional implementation, the first message may further include map version information of a map (for ease of differentiation, the map is replaced with a second map below for description) currently used by the first terminal device. In a specific implementation, the map version information may be a version number, a software serial number, vendor information, or the like of the map. This is not specifically limited in this application.

S220: The first terminal device sends the first message to a server.

In some possible implementations, the first terminal device may send the first message to the server through a network, for example, Bluetooth, a narrowband internet of things, a broadband network, or an air interface message.

S230: The server receives the first message from the first terminal device, and generates a second message.

In some possible implementations, the server may receive, through the network, the first message sent by the first terminal device, and parse the first message, to extract the first location information included in the first message. Then, the server may determine a first reference object based on the first location information. It should be noted herein that there may be one or more first reference objects. For ease of understanding, N1 first reference objects are used as examples below for description. Herein, N1 is a positive integer. Then, the server may generate the second message based on the N1 reference objects. The following determines a plurality of example scenarios based on content included in the first message, and describes, in detail with reference to different scenarios, a process in which the first terminal device determines the N1 first reference objects, to provide different optional implementations.

Scenario 1:

In a scenario in which the first message includes only the first location information, after extracting the first location information, the server may determine the N1 first reference objects in a plurality of manners. The following uses Manner 1 and Manner 2 as examples to describe in detail the process in which the server determines the N1 first reference objects.

Manner 1:

The server may determine a second region from a first map by using the geographical location indicated by the first location information and a preset scope determining rule. Herein, the first map is a map currently used by the server. Then, the server may directly determine all marked reference objects in the second region as the first reference objects, to obtain the N1 first reference objects. Herein, according to the scope determining rule, a circular region that uses the geographical location indicated by the longitude and the latitude in the first location information as a center of a circle and uses a second preset distance as a radius may be determined, or a square region that uses the geographical location indicated by the first location information as a center of gravity and uses a second preset distance as a side length may be determined. The scope determining rule is not specifically limited in this embodiment of this application.

Manner 2:

After determining all the reference objects in the second region, the server does not directly determine all the reference objects in the second region as the first reference objects, but screens all the reference objects in the second region to obtain the N1 first reference objects.

It is assumed that the second region includes N2 reference objects (for ease of differentiation, the reference object is replaced with a second reference object below for description). The server may first extract, from a database corresponding to the server, a measured value and/or a matching parameter of each of at least one attribute feature of each of the N2 second reference objects. It should be noted herein that the database corresponding to the server stores a plurality of types of map data, for example, version information of one or more types of maps used by the server, a reference object included in each type of map, an attribute feature of each reference object, a measured value of each attribute feature of each reference object, a matching parameter corresponding to each attribute feature, and a stability parameter of each attribute feature. This is not specifically limited in this application.

The following briefly explains the measured value and the matching parameter of the attribute feature by using a reference object A in the N2 second reference objects as an example. The reference object A may have one or more attribute features, for example, a height, a width, a color, and geographical coordinates. For an attribute feature (assumed to be an attribute feature B herein) of the reference object A, a measured value stored in the database of the server is last detected by a second terminal device (that is, the reference object A or another reference object around the reference object A) and reported to the server. A matching parameter of the attribute feature B indicates a matching degree between a measured value of the attribute feature B and a preset reference value of the attribute feature B. It should be noted herein that the reference value of the attribute feature is a fixed value of the attribute feature in a period of time. For example, assuming that a designed height of a building is 30 meters, and a value of the height usually does not change in a period of time, the 30 meters may be used as a reference value of the height, namely, an attribute feature, of the building. Values of some attribute features (for example, a color of a leaf and a height of a tree) may change, and therefore reference values corresponding to the attribute features also change. Optionally, the matching parameter that is of the attribute feature B and that is stored in the database may be calculated by the second terminal device based on the measured value of the attribute feature B of the reference object A and the reference value of the attribute feature B that are detected by the second terminal device and sent to the server. Optionally, the matching parameter that is of the attribute feature B and that is stored in the database may alternatively be calculated by the server based on the measured value of the attribute feature B and the reference value of the attribute feature B that are obtained by the server. Herein, the measured value of the attribute feature B may be obtained by the second terminal device by last detecting or measuring the reference object A, or may be obtained by the second terminal device by merging results obtained by last detecting or measuring the reference object A for a plurality of times. This is not specifically limited in this application.

Figure 3:
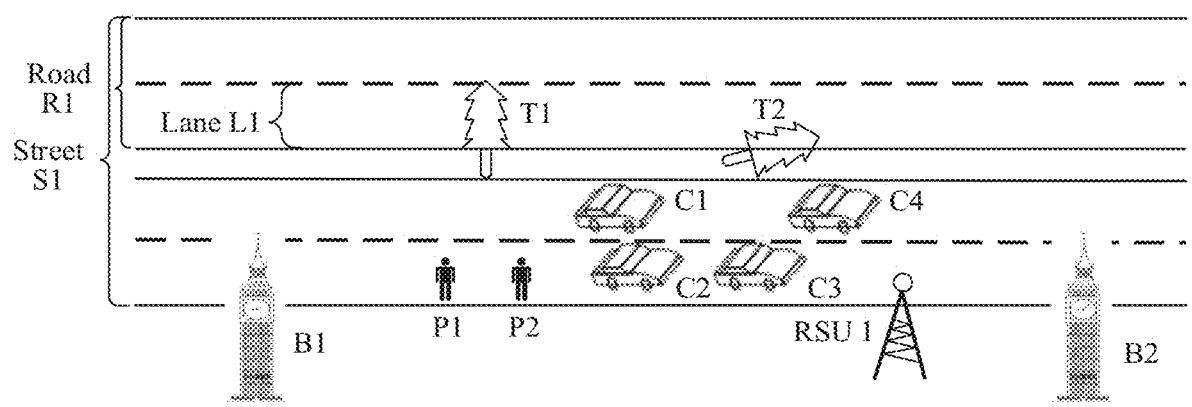
FIG. 3 is a schematic diagram of a positioning scenario according to an embodiment of this application.

In a specific implementation, when the server extracts the matching parameter of each of the at least one attribute feature of each of the N2 second reference objects, the server may calculate, based on the matching parameter of each attribute feature of each second reference object, a combination matching parameter corresponding to each second reference object, where one reference object corresponds to one combination matching parameter. In other words, the server may calculate N2 combination matching parameters corresponding to the N2 second reference objects. FIG. 3 is a schematic diagram of a positioning scenario according to an embodiment of this application. The figure includes a first terminal device (that is, a vehicle C1) and a plurality of second reference objects corresponding to the first terminal device. The plurality of second reference objects may include a road side unit RSU 1, a vehicle C2 (in a low-speed or static state), a vehicle C3 (in a low-speed or static state), a vehicle C4 (in a high-speed moving state), a tree T1, a tree T2 (damaged), a building B1, and a building B2. The following describes, in detail with reference to the scenario shown in FIG. 3, a process in which the server calculates a combination matching parameter corresponding to each second reference object.

Herein, referring to Table 1-1 to Table 1-4, the four tables are all data tables of an attribute feature of a reference object and a matching parameter provided in this embodiment of this application. Each table records reference values and matching parameters of five attribute features, that is, a shape, a height, a color, coordinates, and an ambient weather condition, of one or more second reference objects of a same type. For example, Table 1-1 is a data table corresponding to a second reference object RSU 1, and includes a shape (whose reference value is "triangle"), a height (whose reference value is "10 meters"), a color (whose reference value is "blue"), geographical coordinates (whose reference values are "x1 and y1"), and an ambient weather condition (whose reference value is "sunny") of the second reference object RSU 1. Matching parameters corresponding to the five attribute features, that is, the shape, the height, the color, the coordinates, and the ambient weather condition, of the second reference object RSU 1 are respectively 1, 1, 1, 1, and 1. Specific content of the other three tables is not described herein again. For details, refer to content of the tables respectively.

TABLE 1-1

Data table 1 of an attribute feature of a reference object and a matching parameter

| Attribute feature | Reference value | Matching parameter RSU 1 |
|---|---|---|
| Shape | Triangle | 1 |
| Height | 10 meters | 1 |
| Color | Deep blue | 1 |
| Geographical coordinates | (x1, y1) | 1 |
| Ambient weather condition | Sunny | 1 |

TABLE 1-2

Data table 2 of an attribute feature of a reference object and a matching parameter

| Attribute feature | Reference value | Matching parameter T1 | T2 |
|---|---|---|---|
| Shape | Straight line | 1 | 1 |
| Height | 6 meters | 1 | 0 |
| Color | Green | 1 | 1 |
| Coordinates | (x2, y2) and (x3, y3) | 1 | 1 |
| Ambient weather condition | Sunny | 1 | 1 |

TABLE 1-3

Data table 3 of an attribute feature of a reference object and a matching parameter

| Attribute feature | Reference value | Matching parameter B1 | B2 |
|---|---|---|---|
| Shape | Cuboid | 1 | 1 |
| Height | 30 meters | 1 | 1 |
| Color | Gray | 1 | 1 |
| Coordinates | (x4, y4) and (x5, y5) | 1 | 1 |
| Ambient weather condition | Sunny | 1 | 1 |

TABLE 1-4

Data table 4 of an attribute feature of a reference object and a matching parameter

| Attribute feature | Reference value | Matching parameter C2 | C3 | C4 |
|---|---|---|---|---|
| Shape | Cuboid | 1 | 1 | 1 |
| Height | 1.5 meters | 1 | 1 | 1 |
| Color | Red | 1 | 1 | 1 |
| Coordinate | (x6, y6), (x7, y7), and (x8, y8) | 1 | 1 | 0 |
| Ambient weather condition | Sunny | 1 | 1 | 1 |

In a specific implementation, the server may determine a sum of matching parameters of all attribute features of each second reference objects as a combination matching parameter corresponding to each second reference object. For example, it can be learned from content of Table 1 that matching parameters of the five attribute features of the reference object RSU 1 are respectively 1, 1, 1, 1, and 1, and in this case, the server may determine that a combination matching parameter corresponding to the reference object RSU 1 is 5. Similarly, the server may determine that a combination matching parameter corresponding to each of the reference object B1 and the reference object B2 is 5; a combination matching parameter corresponding to the reference object T1 is 5, and a combination matching parameter corresponding to the reference object T2 is 4; and a combination matching parameter corresponding to each of the reference object C2 and the reference object C3 is 5, and a combination matching parameter corresponding to the reference object C4 is 4. Alternatively, the server may perform weighted summation on the matching parameters of all the attribute features based on a preset weight of each attribute feature, to obtain a combination matching parameter corresponding to each second reference object. Certainly, the server may alternatively process the matching parameters of all the attribute features of each fourth reference object in another calculation manner, to obtain a combination matching feature corresponding to each reference object. This is not specifically limited in this application.

Further, after the server determines the combination matching parameter corresponding to each second reference object, the server may determine, as a first reference object, a second reference object that is in the N2 second reference objects and for which a combination matching parameter is greater than or equal to a first preset parameter, to obtain the N1 first reference objects. For example, with reference to the foregoing example, the server determines that the combination matching parameter corresponding to the reference object RSU 1 is 5; the combination matching parameter corresponding to each of the reference object B1 and the reference object B2 is 5; the combination matching parameter corresponding to the reference object T1 is 5, and the combination matching parameter corresponding to the reference object T2 is 4; and the combination matching parameter corresponding to each of the reference object C2 and the reference object C3 is 5, and the combination matching parameter corresponding to the reference object C4 is 4. Assuming that the first preset parameter is 5, the server may determine the reference object RSU 1, the reference object B1, the reference object B2, the reference object T1, the reference object C2, and the reference object C3 as the first reference objects. Alternatively, the server may first sort the N2 second reference objects based on the N2 combination matching parameters, select N1 second reference objects that are ranked ahead, and determine the N1 second reference objects as the N1 first reference objects.

Herein, because some reference objects are damaged or blocked, measured values of attribute features of the reference objects are easily greatly different from reference values of the attribute features of the reference objects. Therefore, the server can accurately select some improper reference objects by using matching parameters of the attribute features of the reference objects, so that rationality and applicability of the first reference object can be ensured. In addition, herein, the server determines the N1 first reference objects based on the combination matching parameter corresponding to each second reference object. The method is simple and is easily implemented, and can also reduce a data processing amount of the server.

In another specific implementation, when the server extracts the measured value and the matching parameter of each attribute feature of each second reference object, the server may first select N6 sixth reference objects from the N2 second reference objects based on the combination matching parameter corresponding to each of the N2 second reference objects. For a specific process, refer to the foregoing process of selecting the N1 first reference objects from the N2 second reference objects based on the combination matching parameter corresponding to each second reference object. Details are not described herein again.

Then, the server may determine, based on a measured value of each attribute feature of each sixth reference object, a measured value of at least one target attribute feature corresponding to each sixth reference object. It should be noted herein that the target attribute feature is directly formed by or obtained by merging attribute features that are in at least one attribute feature of the reference object and that are relatively obvious or are not easily changed (that is, have high stability). For example, preset attribute features of each reference object include a shape, a height, an area, a color, coordinates, and an ambient weather condition, and the two attribute features, that is, the height and the area, are relatively obvious and are not easily changed. In this case, the two attribute features, that is, the height and the area, may be used as the target attribute features. For another example, preset attribute features of a reference object include a shape, a height, a distance from the first terminal device, and an area. In this case, a relative height determined based on the height and the distance from the first terminal device and a relative area determined based on the area and the distance from the first terminal device may be used as the target attribute features. Then, the server may select N1 first reference objects from the N6 sixth reference objects based on the measured value of each target attribute feature of each sixth reference object. Specifically, the server may sort the N6 sixth reference objects for one or more times (one target attribute feature corresponds to one sorting) based on the measured value of each target attribute feature of each sixth reference object, and determine one or more sixth reference objects that are ranked ahead as one or more first reference objects.

For example, assuming that the target attribute features are the relative height and the relative area, a relative height and a relative area that are of each of the reference object B1 and the reference object B2 in the N6 sixth reference objects and that are calculated by the server are respectively 0.3 meters and 0.06 square meters; a relative height and a relative area of each of the reference object C2 and the reference object C3 are respectively 0.43 meters and 0.61 square meters; a relative height and a relative area of the reference object T1 are respectively 0.43 meters and 0.09 square meters; and a relative height and a relative area of the reference object RSU 1 are respectively 0.2 meters and 0.004 square meters. After obtaining the foregoing data, the server may first sort the reference objects based on values of the relative heights. A specific sequence is that the reference object T1, the reference object C2, and the reference object C3 are ranked first, the reference object B1 and the reference object B2 are ranked second, and the reference object RSU 1 is ranked third. The server may exclude the reference object B1 and the reference object B2 that are ranked second and the reference object RSU 1 that is ranked third. Then, the server may sort the reference object T1, the reference object C2, and the reference object C3 again based on the target attribute feature, that is, the relative area, to obtain a result that the reference object C2 and the reference object C3 are ranked first, and the reference object T1 is ranked second. In this case, the server may separately determine the reference object C2 and the reference object C3 as the first reference objects.

Herein, the server performs secondary screening on the N2 reference objects by using the combination matching parameter and a measured value of a preset target attribute feature, so that a damaged or blocked reference object can be removed more accurately, and therefore a more proper reference object can be determined as the first reference object applicable to the first terminal device, and positioning precision of the first terminal device can be further improved.

Scenario 2:

In a scenario in which the first message includes the first location information and the identification information of each of the N3 third reference objects, in an implementation, the server may alternatively first determine the N2 second reference objects from the first map by using a method similar to that in Manner 1 or Manner 2. Then, the server may directly determine, as a first reference object, a reference object that exists in both the N2 second reference objects and N3 third reference objects, to obtain N1 first reference objects. For example, assuming that the server detects identification information of a reference object A from the identification information of each third reference object, and determines that the N2 second reference objects also include the reference object A, the reference object A is the first reference object. In another implementation, the server may first determine N2 second reference objects from a first map in a process similar to that in Manner 1, and then select reference objects (assumed to be N7 seventh reference objects herein) that exist in both the N2 second reference objects and N3 third reference objects. Then, the server may select N1 first reference objects from the N7 seventh reference objects based on a measured value and/or a matching parameter of at least one attribute feature of each seventh reference object. For a specific selection process, refer to the foregoing process of selecting the first reference objects based on the measured value and/or the matching parameter of each of the at least one attribute feature of each second reference object in Manner 2. Details are not described herein again. In still another implementation, the server may alternatively perform feature matching on each second reference object and each third reference object based on a measured value of each attribute feature of each second reference object and a measured value of each attribute feature of each third reference object, and determine a reference object obtained after the feature matching succeeds as a first reference object. For example, it is assumed that each second reference object and each third reference object include a reference object A. If a difference between a measured value of each attribute parameter of the reference object A in the N2 second reference objects and a measured value of each attribute parameter of the reference object A in the N3 third reference objects falls within an allowable error scope, it is considered that matching for the reference object A succeeds, and therefore the reference object A may be used as the first reference object.

Herein, the server comprehensively considers the third reference object provided by the first terminal device and the second reference object selected, based on the location information, by the server from the map currently used by the server, to ensure that the selected first reference object is a newly marked reference object on the current map, and can also be correctly detected by the first terminal device, so that rationality and reliability of the first reference object determined by the server can be ensured.

Scenario 3:

In a scenario in which the first message includes the first location information and the environment information, the server may first process the environment information by using an algorithm such as object recognition, to obtain the N3 third reference objects included in the environment information. Then, the server may determine N1 first reference objects based on the N3 third reference objects and the N2 second reference objects determined based on the first location information. For a specific process, refer to the process in Scenario 2. Details are not described herein again. Herein, the server determines the first reference object from the first map based on the environment information of the first terminal device and the first location information of the first terminal device, to ensure that the first reference object determined by the server is a newly marked reference object on the current map, and can also be fully detected by the first terminal device, so that rationality and reliability of the determined first reference object can be ensured.

Scenario 4:

In a scenario in which the first message includes the first location information and the map version information of the second map, the server may first determine the N2 second reference objects from the first map by using the method in Manner 1 or Manner 2. Then, the server may find the second map from one or more versions of maps stored in the database of the server, and then determine the N3 third reference objects from the second map by using the method in Manner 1 or Manner 2. Subsequently, the server may determine N1 first reference objects based on the N3 third reference objects and the N2 second reference objects. For a specific process, refer to the process in Scenario 2. Details are not described herein again. Alternatively, the server may first determine the second map based on the map version information, and then may determine N1 first reference objects from the second map by using the method in Manner 2. For a specific process, refer to the foregoing descriptions. Details are not described herein again.

After determining the N1 first reference objects, the server may generate a second message based on the N1 reference objects. For example, the server may generate the second message based on identification information of each of the N1 first reference objects. Alternatively, the server may generate the second message based on identification information of each first reference object and a measured value and/or a matching parameter of each of at least one attribute feature of each first reference object.

Optionally, the second message generated by the server may further include application scope indication information. The application scope indication information is mainly used to indicate a preset geographical scope to which the second message is applicable. For example, the application scope indication information may include first indication information, second indication information, third indication information, and fourth indication information, which are respectively used to indicate four levels corresponding to the second message, and different levels correspond to different preset geographical scopes. When the application scope indication information is the first indication information, it indicates that the second message corresponds to a first level, and it indicates that the preset geographical scope to which the second message is applicable is a first terminal device. When the application scope indication information is the second indication information, it indicates that the second message corresponds to a second level, and it indicates that the preset geographical scope to which the second message is applicable is a lane on a road, for example, a lane L1 shown in FIG. 3. When the application scope indication information is the third indication information, it indicates that the second message corresponds to a third level, and it indicates that the preset geographical scope to which the second message is applicable is a road, for example, a road R2 or a road R1 shown in FIG. 3. When the application scope indication information is the fourth indication information, it indicates that the second message corresponds to a fourth level, and it indicates that the preset geographical scope to which the second message is applicable is a street, for example, a street SI shown in FIG. 3. Certainly, it may be understood that the preset geographical scope may alternatively be divided in another form. This is not specifically limited in this application.

Optionally, the server may determine, based on a current load of the server, the application scope indication information included in the second message sent by the server. Herein, the load of the server is a parameter used to indicate a busy degree of the server, for example, a quantity of processes being processed by the server or a quantity of terminal devices currently connected to the server. This is not specifically limited in this application. A heavier load of the server indicates a busier server. In the following descriptions, with reference to the four levels corresponding to the four pieces of indication information, when determining that the current load of the server is less than a first preset load, the server may determine that the second message includes the first indication information. When determining that the current load of the server is greater than or equal to the first preset load and less than a second preset load, the server may determine that the second message includes the second indication information. When determining that the current load of the server is greater than or equal to the second preset load and less than a third preset load, the server may determine that the second message includes the third indication information. When determining that the current load of the server is greater than or equal to the third preset load, the server may determine that the second message includes the fourth indication information. Herein, the first preset load is less than the second preset load, and the second preset load is less than the third preset load. Herein, different application scopes are set for the second message, so that the server sends a second message with a large application scope when the load is heavy, and sends a second message with a small application scope when the load is light. Therefore, this avoids a case in which the server still needs to send the second message to each first terminal device when the load is heavy, and helps ensure load balancing of the server.

Optionally, in actual application, the second message may specifically include one or more groups of advanced units. One group of advanced units includes identification information (for example, a number) and/or one or more groups of basic units of one first reference object. Each group of basic units may include at least one of an attribute feature field, a measured value field, and a matching parameter field. In other words, one group of advanced units is used to indicate one or more attribute features of a first reference object and reference values and matching parameters of these attribute features. FIG. 4 is a schematic structural diagram of a second message according to an embodiment of this application. As shown in FIG. 4, the second message includes two groups of advanced units. A first group of advanced units corresponds to a first reference object with a number 1 and two groups of basic units of the first reference object. Each group of basic units includes three fields, which respectively represent an attribute of the first reference object, a reference value of the attribute, and a matching parameter of the attribute. Similarly, a second group of advanced units corresponds to a first reference object with a number 2 and a group of basic units of the first reference object.

S240: The server sends the second message to the terminal device.

In a specific implementation, the server may send the second message to the first terminal device through a network. Herein, the server may send the second message in different sending manners. The sending manner includes unicast, multicast, or broadcast. For example, the server may send, in a unicast manner, the second message that includes the first indication information or the second indication information to the first terminal device. Alternatively, the server may send, in a multicast manner, the second message that includes the third indication information to the first terminal device. Alternatively, the server may send, in a broadcast manner, the second message that includes the fourth indication information to the first terminal device.

S250: The first terminal device receives the second message from the server, and updates the first location information based on the first reference object.

In some possible implementations, the first terminal device may receive the second message from the server through the network, then may extract the identification information of each of the N1 first reference objects from the second message, and determine that the first terminal device may perform a positioning function by using the N1 first reference objects, to further update the first location information.

In a possible implementation, the first terminal device may perform feature matching-based positioning based on the N1 first reference objects, to obtain location information (for ease of differentiation, the location information is replaced with a second location below for description) obtained after the first terminal device receives the first message. Specifically, the first terminal device may first measure a real-time observation value of each of the at least one attribute feature of each first reference object by using a detection apparatus such as a camera or radar installed on the first terminal device, and then perform feature matching based on the real-time observation value that is of each attribute feature of each first reference object and that is measured by the first terminal device and the reference value that is of each attribute feature of each first reference object and that is stored in the map data of the first map. For example, it is assumed that the one or more first reference objects include a reference object A, and the reference object A corresponds to an attribute feature 1 and an attribute feature 2. The first terminal device detects, by using the detection apparatus, that a real-time observation value of the attribute feature 1 is w1, and a real-time observation value corresponding to the attribute feature 2 is w2; and a reference value that is of the attribute feature 1 of the reference object A and that is stored in the map data of the first terminal device is p1, and a reference value of the attribute feature 2 is p2. If the first terminal device determines that an error value between the reference value p1 and the real-time observation value w1 and an error value between the reference value p2 and the real-time observation value w2 each fall within an allowable error scope, the first terminal device determines that the feature matching for the reference object B succeeds, that is, determines that the to-be-used reference object B is indeed around the first terminal device and can be correctly detected by the first terminal device. Similarly, the first terminal device may perform matching on the N1 first reference objects one by one. If the first terminal device determines that a real-time observation value and a reference value of each of one or more attribute features of one or more first reference objects in the first reference objects are matched, the first terminal device determines that the one or more first reference objects exist around the first terminal device. Then, the first terminal device may extract location information of the one or more first reference objects from the map data of the first terminal device, and estimate the current second location information of the first terminal device based on the location information of the one or more first reference objects. Subsequently, the first terminal device may update the data in the first location information to data in the second location information.

In another possible implementation, the first terminal device may alternatively first estimate current second location information of the first terminal device based on location information that is of all first reference objects and that is obtained after comparison succeeds, perform positioning based on a satellite signal and perform dead reckoning positioning based on an inertial measurement unit to obtain third location information and fourth location information, and then merge specific data of the three pieces of location information, so as to obtain more accurate fifth location information. Subsequently, the first terminal device may update the data in the first location information to data in the fifth location information.

In still another possible implementation, when the second message further includes the measured value and/or the matching parameter of each of the at least one attribute feature of each first reference object, after receiving the second message, the first terminal device may first screen the N1 first reference objects based on the measured value and/or the matching parameter of each of the at least one attribute feature of the first reference object, to obtain one or more selected first reference objects. For a specific process, refer to the foregoing process of selecting the N1 first reference objects from the N2 second parameters based on the measured value and/or the matching parameter of each of the at least one attribute feature of each of the N2 second reference objects in Manner 2. Details are not described herein again. Then, the first terminal device may update the first location information based on the one or more selected first reference objects. For a specific process, refer to the foregoing process of updating the first location information based on the N1 first reference objects. Details are not described herein again.

It should be additionally noted that in yet another possible implementation, after the server determines, by using the screening method provided in Scenario 1 to Scenario 4, one or more reference objects (herein, for ease of differentiation, the reference objects are replaced with N5 fifth reference objects below for description) applicable to the first terminal device, the server may determine one or more reference objects (for ease of differentiation, the reference objects are replaced with N6 sixth reference objects herein for description) indicated in the second message that is last sent by the server to the first terminal device. Then, the server may remove a reference object that is in the N5 fifth reference objects and that overlaps with the N6 sixth reference objects, to obtain the N1 first reference objects. For example, assuming that the N5 fifth reference objects determined by the server include a reference object A, a reference object B, and a reference object C, and the N6 sixth reference objects include the reference object C, it indicates that the server has pushed the reference object C to the first terminal device, and the server may separately use the reference object A and the reference object B as the first reference objects. In this way, the server can be prevented from repeatedly pushing a same reference object to the first terminal device, so that overheads of signaling between the server and the first terminal device can be reduced. Further, the server may also determine sixth reference objects that are in the N6 sixth reference objects and that do not overlap with the N5 fifth reference objects, and generate a to-be-deleted identifier set based on identification information of these sixth reference objects. Then, the server may use a second message to carry the to-be-deleted identifier set, and send the second message to the first terminal device, to notify the first terminal device that these sixth reference objects are no longer used. For example, assuming that the N6 sixth reference objects further include a reference object D, but the N5 fifth reference objects do not include the reference object D, the server may use the to-be-deleted identifier set to carry identification information of the reference object D, and send the to-be-deleted identifier set to the first terminal device by using the second message, to notify the first terminal device that the reference object D is no longer applicable.

In this case, after receiving the second message, the first terminal device may first store the identification information of the N1 first reference objects in a reference object identifier set that is preset by the first terminal device, and remove the identification information included in the to-be-deleted identifier set from the reference object identifier set, to obtain an updated reference object identifier set. Herein, the reference object identifier set stores identification information of one or more reference objects required by one or more first terminal devices to perform a positioning function. Then, the first terminal device may select some or all reference objects from the plurality of reference objects indicated by the reference object identifier set, and update the first location information based on the some or all reference objects. In a specific implementation, for a process in which the first terminal device updates the first location information based on the some or all reference objects, refer to the foregoing process in which the first terminal device updates the first location information based on the identification information of each first reference object. Details are not described herein again.

In this embodiment of this application, the server may select an applicable first reference object for the first terminal device and push the applicable first reference object to the first terminal device, to resolve a problem of low positioning precision caused by using a damaged or blocked reference object by the first terminal device, so that positioning precision of the first terminal device is improved.

Embodiment 2

Figure 5:
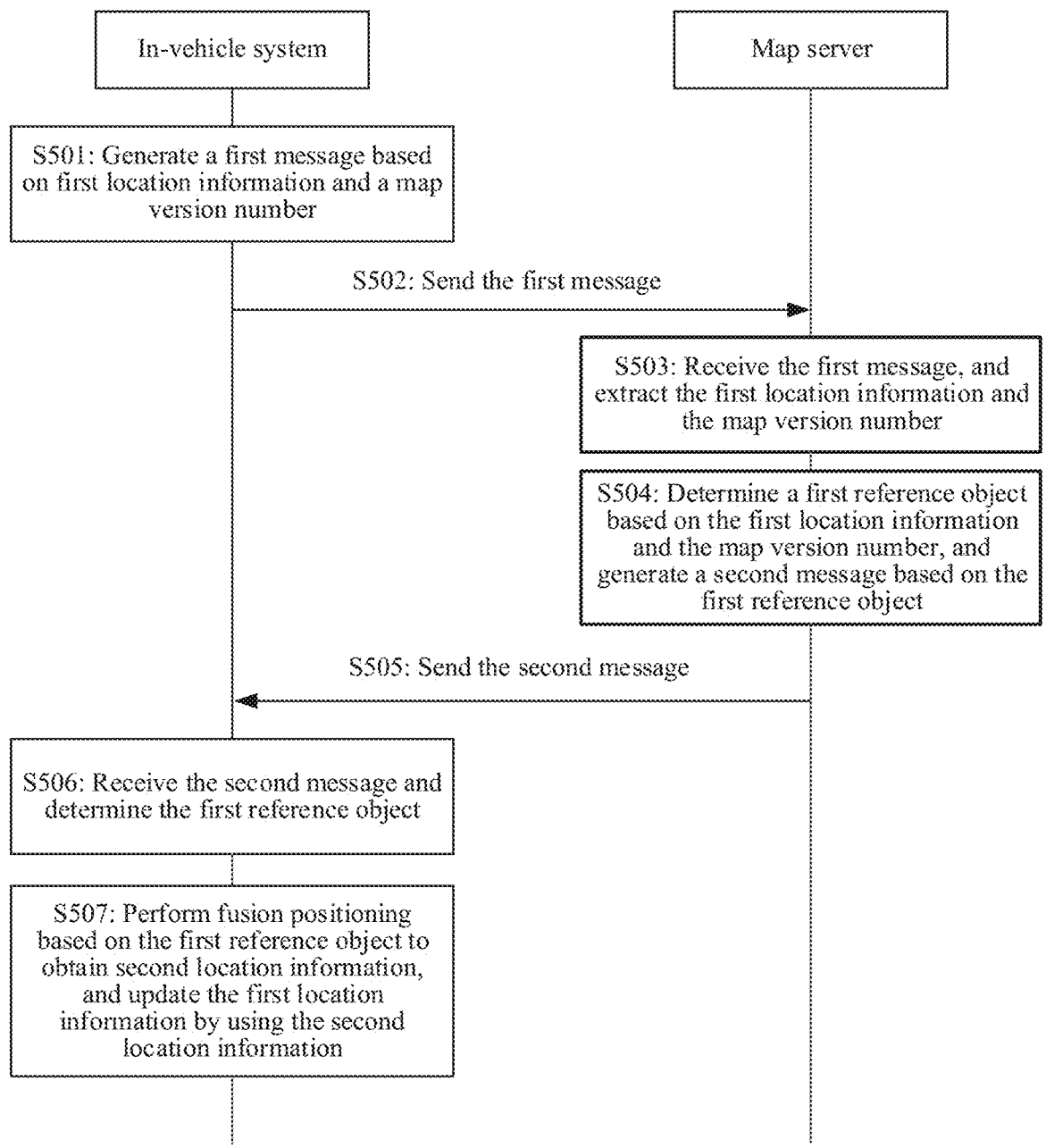
FIG. 5 is another schematic flowchart of a positioning method according to an embodiment of this application.

FIG. 5 is another schematic flowchart of a positioning method according to an embodiment of this application. It can be learned from FIG. 5 that the method includes the following steps.

S501: An in-vehicle system generates a first message based on first location information and a map version number.

In a specific implementation, after the in-vehicle system determines that a positioning function needs to be performed, the in-vehicle system may first obtain one piece of first location information by using a built-in global positioning system. The first location information may specifically include longitude and latitude of a vehicle (for ease of differentiation, the vehicle is replaced with a first vehicle below for description) that carries the in-vehicle system. Optionally, the in-vehicle system may also extract, from a historical positioning information record of the in-vehicle system, location information obtained by the in-vehicle system by last performing a positioning function, and use the location information as the first location information. The in-vehicle system may further obtain a map version number corresponding to a second map currently used by the in-vehicle system. Then, the in-vehicle system may generate a first message according to a communications protocol between the in-vehicle system and a first terminal device, where the first message includes the first location information and the map version number.

S502: The in-vehicle system sends the first message to a map server.

In a specific implementation, after generating the first message, the in-vehicle system may send the first message to the map server through a network.

S503: The map server receives the first message, and extracts the first location information and the map version number.

In a specific implementation, after receiving the first message through the network, the map server may parse the first message according to a communications protocol between the map server and the first terminal device, to extract the first location information and the map version number from the first message.

S504: The map server determines a first reference object based on the first location information and the map version number, and generates a second message based on the first reference object.

In a specific implementation, after extracting the first location information and the map version number, the map server may first find, based on the map version number from a plurality of versions of maps stored in a database of the map server, the second map currently used by the first terminal device. Then, the map server may determine, by using a geographical location indicated by the longitude and latitude in the first location information as a center of a circle and using 1000 meters as a radius, a circular region from the second map and use the circular region as a screening region. The map server may extract all reference objects (assumed to be N2 second reference objects herein) included in the screening region. Subsequently, the map server may determine one or more first reference objects (assumed to be N1 first reference objects herein, where N1 is a positive integer less than or equal to N2) from the N2 second reference objects based on one or more measured values and/or one or more matching parameters of one or more attribute features of each of the N2 second reference objects. For a specific process in which the map server determines the N1 first reference objects from the N2 second reference objects based on the one or more measured values and/or the one or more matching parameters of the one or more attribute features of each second reference object, refer to the process of determining the N1 first reference objects in Manner 2 in Embodiment 1. Details are not described herein again.

After determining the N1 first reference objects, the map server may extract a number of each of the N1 first reference objects from the database of the map server, and then generate the second message according to the communications protocol between the map server and the first terminal device, where the second message includes the number of each first reference object.

S505: The map server sends the second message to the in-vehicle system.

In a specific implementation, after generating the second message, the map server may send the second message to the first terminal device through the network.

S506: The in-vehicle system receives the second message and determines the first reference object.

In a specific implementation, after receiving the second message through the network, the in-vehicle system may parse the second message according to the communications protocol between the in-vehicle system and the first terminal device, to extract the number of each first reference object from the second message, so as to further determine the N1 first reference objects.

S507: The in-vehicle system performs merging-based positioning based on the first reference object to obtain second location information, and updates the first location information by using the second location.

In a specific implementation, after determining the N1 first reference objects, the in-vehicle system may first measure at least one attribute feature of each first reference object by using a sensing apparatus such as a camera or radar installed in the in-vehicle system, to obtain a measurement result (to distinguish from the foregoing descriptions, the measured value is replaced with a real-time observation value below for description) of each attribute feature of each first reference object. Then, the in-vehicle system may extract a reference value of each attribute feature of each first reference object from map data corresponding to the second map used by the in-vehicle system, and perform feature matching based on the real-time observation value and the reference value of each attribute feature of each first reference object. For a specific matching process, refer to the matching process in step S250 in Embodiment 1. Details are not described herein again. Subsequently, the in-vehicle system may obtain one or more first reference objects that are in the N1 reference objects and that are obtained after the matching succeeds. Then, the in-vehicle system may extract location data of the one or more first reference objects from map data of a first map, and estimate the current second location information of the in-vehicle system based on the location data of the one or more first reference objects. The in-vehicle system may further perform positioning based on an inertial measurement unit, to obtain third location information. The in-vehicle system may calculate an average value of longitude included in the first location information, the second location information, and the third location information and an average value of latitude included in the first location information, the second location information, and the third location information, and use the calculated average value of the longitude and the calculated average value of the latitude as longitude and latitude included in fourth location information of the in-vehicle system. Finally, the in-vehicle system may update the longitude and latitude in the first location information to the longitude and latitude in the fourth location information. Herein, the updated first location information is a positioning result obtained by the in-vehicle system by performing the positioning function this time.

In this embodiment of this application, the map server may select an applicable first reference object for the in-vehicle system based on the first location information of the in-vehicle system and the map version number, and push the applicable first reference object to the in-vehicle system, so that the in-vehicle system can subsequently perform positioning by using the applicable first reference object. In this way, this can avoid a problem of low positioning precision caused by performing positioning by the in-vehicle system by using an inapplicable reference object such as a damaged or blocked reference object, so that positioning precision of the in-vehicle system can be improved.

Embodiment 3

Figure 6:
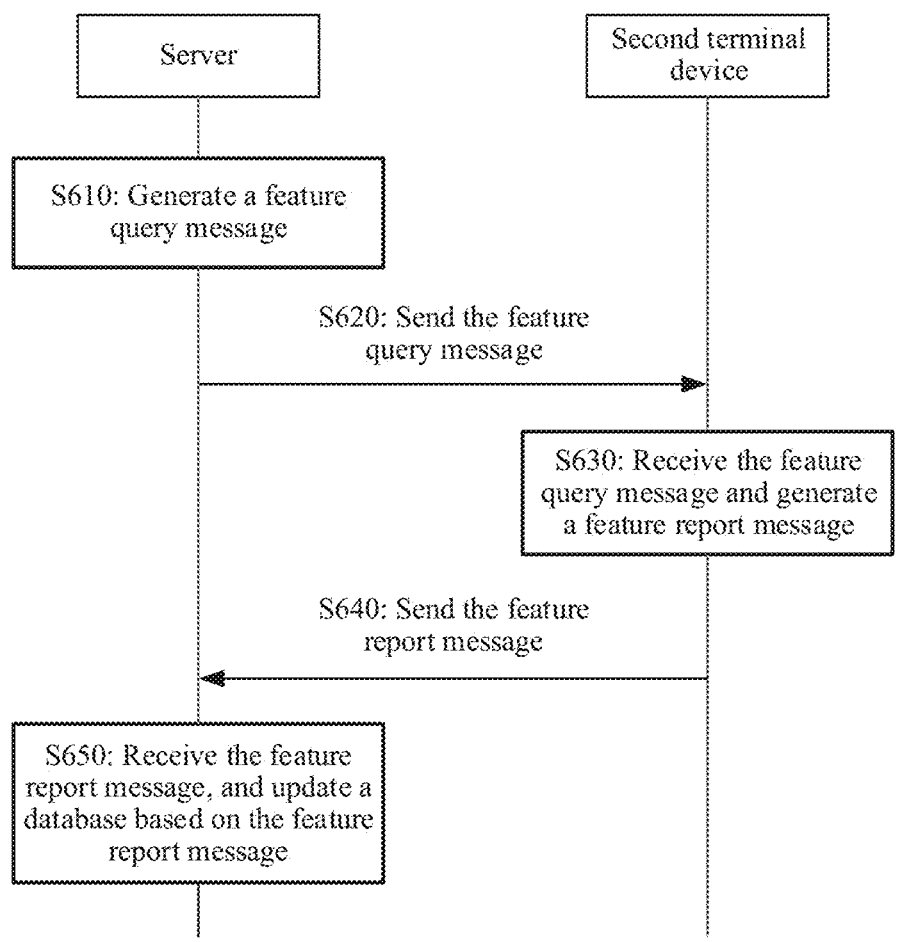
FIG. 6 is another schematic flowchart of a positioning method according to an embodiment of this application.

FIG. 6 is another schematic flowchart of a positioning method according to an embodiment of this application. The positioning method is also applicable to the positioning system shown in FIG. 1. It can be learned from FIG. 6 that the positioning method may include the following steps.

S610: A server generates a feature query message.

In some possible implementations, the server may first determine, according to a preset reference object query rule, one or more reference objects from marked reference objects on a first map used by the server. Herein, the reference object query rule is used to select reference objects whose values of attribute features are easily changed (that is, stability of the attribute features is low). For ease of understanding and differentiation, the reference objects are replaced with N4 fourth reference objects below for description. Then, the server may generate a feature query message based on identification information of the N4 fourth reference objects. It should be noted herein that the foregoing second terminal device is specifically a device that can measure an attribute feature of the second terminal device or another reference object around the second terminal device and that can report a measurement result of the attribute feature and/or a calculated matching parameter of the attribute feature to the server. For example, the second terminal device may be the foregoing first terminal device, may be an apparatus such as an RSU, or may be a reference object that can detect only an attribute feature of the second terminal device.

In a specific implementation, the server may first extract location information (for ease of differentiation, the location information is replaced with fifth location information below for description) of the second terminal device from a database of the server. Then, the server may determine one or more reference objects (for ease of differentiation, the reference objects are replaced with N8 eighth reference objects below for description) from the first map based on the fifth location information. For a specific process, refer to the foregoing process in which the server determines the N2 second reference objects from the first map based on the first location information. Details are not described herein again. Subsequently, the server may calculate a combination matching parameter corresponding to each eighth reference object based on a matching parameter of each attribute feature of each of the N8 eighth reference objects, and determine an eighth reference object for which a combination matching parameter is less than a third preset parameter as the fourth reference object, to obtain the N4 fourth reference objects. Alternatively, the server may extract, from the database of the server, a stability parameter corresponding to at least one attribute feature of each eighth reference object. If the server determines that stability parameters of at least a preset quantity of attribute features of an eighth reference object each are less than a first preset stability parameter, the server may determine the eighth reference object as the fourth reference object. The server repeats this operation to obtain the N4 fourth reference objects. It may be understood that the server may alternatively determine the fourth reference object from the N8 eighth reference objects in another manner. This is not specifically limited in this application.

Further, after determining the N4 fourth reference objects, the server may extract identification information of each fourth reference object and one or more attribute features that are of each fourth reference object and for which one or more stability parameters each are less than the first preset stability parameter, and then generate the feature query message based on the identification information and the one or more attribute features.

For example, it is assumed that the fourth reference objects include a reference object A and a reference object B, stability parameters of an attribute feature 1 and an attribute feature 2 of the reference object A each are less than the first preset stability parameter, and a stability parameter of an attribute feature 1 of the reference object B is less than the first preset stability parameter. If the second terminal device is the reference object A or the reference object B, the server may generate a feature query message for each of the reference object A and the reference object B. The feature query message corresponding to the reference object A may include the attribute feature 1 and the attribute feature 2, and the feature query message corresponding to the reference object B may include the reference attribute feature 1. For example, a format of the feature query message of the reference object A may be {number 1, attribute feature 1, attribute feature 2}. If the second terminal device is a device (for example, the first terminal device or the RSU) that can detect the reference object A and the reference object B, the server may generate first feature query information, where the feature query information may include a combination of identification information of the reference object A and the attribute feature 1 and the attribute feature 2 that are associated with the identification information of the reference object A, and a combination of identification information of the reference object B and the attribute feature 1 associated with the identification information of the reference object B. For example, a specific format of the feature query message may be {[number 1, attribute feature 1, attribute feature 2], [number 2, attribute feature 1]}.

Optionally, the feature query message may further include reporting manner indication information corresponding to at least one attribute feature of the fourth reference object. Reporting manner indication information of any attribute feature is used to indicate a reporting manner used by the second terminal device to subsequently report a measured value and/or a matching parameter of the attribute feature. Herein, the reporting manners may mainly include periodic reporting and aperiodic reporting. The reporting manner indication information may include first indication information and second indication information, the first indication information is used to indicate periodic reporting, and the second indication information is used to indicate aperiodic reporting. In a specific implementation, if the server determines that a stability parameter of an attribute feature that is of the fourth reference object and that needs to be reported is less than a second preset stability parameter, the server may determine that the attribute feature may be periodically reported, to determine that the attribute feature corresponds to the first indication information. When determining that the stability parameter of the attribute feature is greater than or equal to the second preset stability parameter, the server may determine that the attribute feature may be aperiodically reported, to determine that the attribute feature corresponds to the second indication information.

It should be additionally noted that if an attribute feature needs to be periodically reported, this reporting period may be negotiated in advance between the server and the second terminal device, or may be specified by the server by using the feature query message. If an attribute feature needs to be aperiodically reported, an information reporting node may be negotiated in advance between the server and the second terminal device, or may be specified by the server by using the feature query message.

The following describes a specific format of the feature query message by using an example with reference to the foregoing content and a type of the second terminal device. For example, assuming that the second terminal device is a reference object, for example, the reference object A, a feature query message sent to the reference object A may be specifically {attribute feature 1, attribute feature 2}, and indicate the reference object A to report related information of the attribute feature 1 and the attribute feature 2, or a feature query message of the reference object A may be (attribute feature 1, first indication information, attribute feature 2, second indication information), and indicate the reference object A to periodically report related information of the attribute feature 1, and to aperiodically report related information of the attribute feature 2. For another example, assuming that the second terminal device is the first terminal device or the RSU, a feature query message sent to the second terminal device may be specifically {number 1, attribute feature 1, number 2, attribute feature 2}, and indicate the second terminal device to report related information of the attribute feature 1 of the reference object whose identification information is the number 1 and related information of the attribute feature 2 of the reference object whose identification information is the number 2; or a feature query message sent to the second terminal device may be {number 1, attribute feature 1, first indication information, number 2, attribute feature 2, second indication information}, and indicate the second terminal device to periodically report related information of the attribute feature 1 of the reference object whose identification information is the number 1, and to aperiodically report related information of the attribute feature 2 of the reference object whose identification information is the number 2. Certainly, it may be understood that the content of the feature query message may alternatively include another combination of the attribute feature, the identification information of the reference object, and the reporting manner of the attribute feature. Details are not described in this embodiment of this application.

S620: The server sends the feature query message to the second terminal device.

In some possible implementations, after generating the feature query message, the server may send the feature query message to the second terminal device through a network.

S630: The second terminal receives the feature query message and generates a feature report message.

In some possible implementations, after receiving the feature query message through the network, the second terminal device may determine attribute features (where measured values and matching parameters of these attribute features need to be reported) of each fourth reference object based on the content of the feature query message. It may be understood that these attribute features may be attribute features of the second terminal device, or may be attribute features of some reference objects around the second terminal device. This is not specifically limited in this application. Then, the second terminal device may obtain a measured value of each attribute feature of each fourth reference object through measurement by using a sensor of the second terminal device. Subsequently, the second terminal device may extract a reference value of each attribute feature of each fourth reference object from a database of a map currently used by the second terminal device, and determine a matching parameter of each attribute feature of each fourth reference object based on the measured value and the reference value of each attribute feature of each fourth reference object. Then, the second terminal device may generate the feature report message based on the measured value and the matching parameter of each attribute feature of each fourth reference object.

Optionally, because processes in which the second terminal device determines matching parameters of all attribute features are the same, descriptions are provided below by using an example in which the second terminal device determines a matching parameter of an attribute feature 1. In a specific implementation, the second terminal device may first obtain a measured value (assumed to be L1 herein) of the attribute feature 1 through measurement by using the sensor of the second terminal device. Then, the second terminal device may obtain a reference value (assumed to be L2 herein) of the attribute feature 1. Subsequently, the second terminal device may determine whether the measured value and the reference value of the attribute feature 1 are the same. If the server determines that the measured value and the reference value of the attribute feature 1 are the same, the server may determine that a matching parameter corresponding to the attribute feature 1 is 1. If the server determines that the measured value and the reference value of the attribute feature 1 are different, the server may determine that a matching parameter corresponding to the attribute feature 1 is 0. Alternatively, the second terminal device may calculate a difference L2-L3 between the measured value and the reference value of the attribute feature 1. If the second terminal device determines that L2-L3 falls within a preset error scope, the second terminal device may determine that a matching parameter corresponding to the attribute feature 1 is 1. If the second terminal device determines that L2-L3 does not fall within a preset error scope, the second terminal device may determine that a matching parameter corresponding to the attribute feature 1 is 0. Alternatively, the second terminal device may set a plurality of allowable error scopes, and different allowable error scopes correspond to different matching parameters. For example, a matching parameter corresponding to a first allowable error scope is 1, a matching parameter corresponding to a second allowable error scope is 2, and The first allowable error scope includes the second allowable error scope. If the second terminal device determines that L2-L3 does not fall within the first allowable error scope, the second terminal device may determine that a matching parameter corresponding to the attribute feature 1 is 0. If the second terminal device determines that L2-L3 falls within the first allowable error scope but does not fall within the second allowable scope, the second terminal device may determine that a matching parameter corresponding to the attribute feature 1 is 1. If the second terminal device determines that L2-L3 falls within the second allowable error scope, the second terminal device may determine that a matching parameter corresponding to the attribute feature 1 is 2. Certainly, it should be noted that the second terminal device may alternatively set other different rules to indicate a relationship between the matching parameter and a combination of the measured value and the reference value that are of the attribute feature. This is not specifically limited in this application.

Optionally, when the second terminal device is the first terminal device, an attribute feature corresponding to the second terminal device usually includes location information of the first terminal device and a matching parameter of the attribute feature. In this way, the server can determine, based on the location information of the first terminal device and the matching parameter of the attribute feature, whether the first terminal device is always in a moving state, so that a proper reference object can be better selected for the first terminal device.

Further, after determining the measured value and the matching parameter of each attribute feature of each fourth reference object, the second terminal device may generate the feature reporting message based on the measured value and the matching parameter of each attribute feature of each fourth reference object. It should be noted that if reporting manners of the attribute features of the fourth reference object include both periodic reporting and aperiodic reporting, the second terminal device may generate a different feature reporting message based on a different reporting manner of each attribute feature.

It should be additionally noted that in this embodiment, the second terminal device may also actively generate the feature reporting message without generating the feature reporting message after receiving the feature query message sent by the server. In a specific implementation, when detecting that a preset feature reporting condition is met (for example, a preset reporting period or a reporting time node expires), the second terminal device may determine, according to a preset reference object query rule, the N4 fourth reference objects from the second map currently used by the second terminal device or the environment information collected by the second terminal device. For a specific process, refer to the foregoing process in which the server determines the N4 fourth reference objects according to the preset reference object query rule. Details are not described herein again. Then, the second terminal device may also extract, from map data of the second map, identification information of each fourth reference object and one or more attribute features that are of each fourth reference object and for which one or more stability parameters each are less than a first preset stability parameter, and determine that measured values and/or matching parameters of these attribute features need to be reported. For a specific process, refer to the foregoing process in which the server determines the one or more attribute features that need to be reported. Details are not described herein again. Subsequently, the second terminal device may generate the feature reporting message based on the identification information and the one or more attribute features.

S640: The second terminal device sends the feature reporting message to the server.

In some possible implementations, after generating the feature reporting message, the second terminal device may send the feature reporting message to the server through the network.

S650: The server receives the feature report message, and updates a database based on the feature report message.

In some possible implementations, after receiving the feature report message, the server may extract the measured value and/or the matching parameter that are/is of each attribute feature of each fourth reference object and that are/is included in the feature report message. Then, the server may update a measured value and/or a matching parameter that are/is of each attribute feature of each fourth reference object and that are/is stored in the database of the server to the measured value and/or the matching parameter that are/is of each attribute feature of each fourth reference object and that are/is included in the feature report message. For example, it is assumed that the feature report message includes a measured value L1 of a reference object A and a matching parameter C1. The server may update the measured value that is of the reference object A and that is stored in the database of the server from L4 to L1, and update the matching parameter from C2 to C1.

It should be additionally noted that in an optional implementation, the server may update a reference value that is of the attribute feature of the reference object and that is stored in the database of the server. For example, if the server determines that a measured value that is of an attribute feature and that is received by the server in a preset period is L5, the server may update the reference value of the attribute feature to L5. In another optional implementation, the server may alternatively update the reference value that is of the attribute feature and that is in the database of the server by using a reference value that is of an attribute feature and that is reported by the second device.

In this embodiment of this application, the server may update, based on the measured value and the matching parameter that are of the attribute feature of the reference object and that are reported by the second terminal device, the measured value and/or the matching parameter that are/is of the attribute feature of the reference object and that are/is stored in the database of the server, so that authenticity and reliability of data that is in the database and that is associated with the reference object can be ensured.

Embodiment 4

Figure 7:
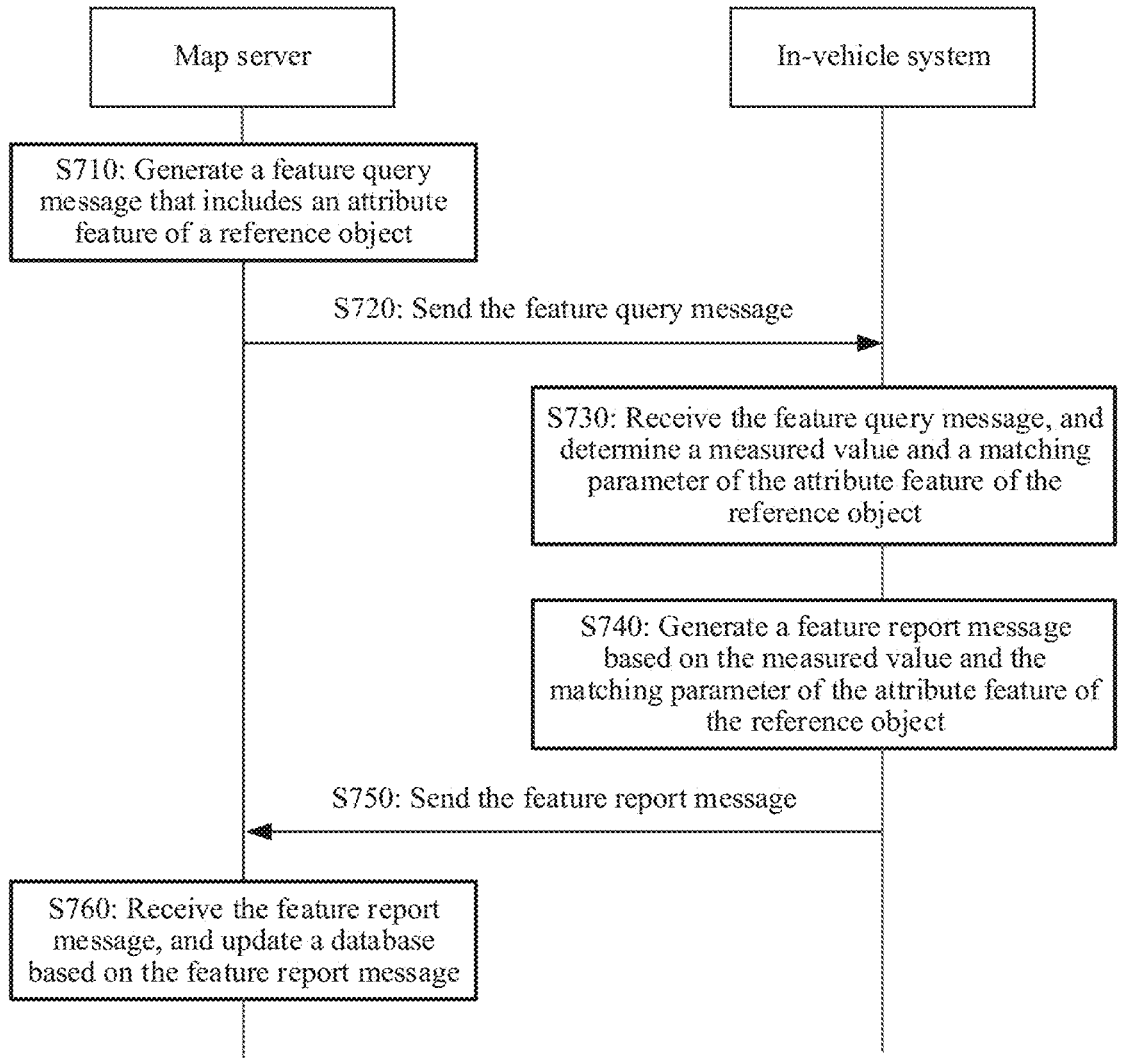
FIG. 7 is another schematic flowchart of a positioning method according to an embodiment of this application.

FIG. 7 is another schematic flowchart of a positioning method according to an embodiment of this application. It can be learned from FIG. 7 that the positioning method includes the following steps.

S710: A map server generates a feature query message that includes an attribute feature of a reference object.

In a specific implementation, the map server may first obtain location information (for ease of differentiation, the location information is replaced with fifth location information below for description) of an in-vehicle system. Then, the map server may determine, by using a geographical location indicated by the fifth location information as a center of a circle and using 50 meters as a radius, a circular region from a first map currently used by the map server. Subsequently, the map server may obtain all marked reference objects (assumed to be N8 eighth reference objects herein, where N8 is a positive integer) in the circular region. The map server may obtain, from a database used by the map server, a matching parameter of at least one attribute feature corresponding to each of the N8 eighth reference objects, and calculate, based on the matching parameter of the at least one attribute feature of each eighth reference object, a combination matching parameter corresponding to each eighth reference object. For a specific calculation process, refer to the process of calculating the combination matching parameter corresponding to each second reference object in step S210 in Embodiment 1. Details are not described herein again. Then, the map server may determine an eighth reference object that is in the N8 eighth reference objects and for which a combination matching parameter is less than a third preset parameter as a reference object (herein, for ease of differentiation, the reference object is replaced with a fourth reference object below for description) that needs to be included in the feature query message. The map server determines each eighth reference object by using the third preset parameter, to determine at least one fourth reference object (assumed to be N4 fourth reference objects herein).

Then, the map server may extract a stability parameter of each of at least one attribute feature of each fourth reference object from the database, and then determine one or more attribute features (for ease of differentiation, the attribute feature is replaced with a to-be-reported attribute feature below for description) for which one or more stability parameters each are less than a first preset stability parameter from the at least one attribute feature of each fourth reference object. The map server may generate, based on a predetermined communications protocol between the map server and the in-vehicle system, a feature query message that includes identification information of each fourth reference object and at least one to-be-reported attribute feature of each fourth reference object.

S720: The map server sends the feature query message to the in-vehicle system.

In a specific implementation, after generating the feature query message, the map server may send the feature query message to the in-vehicle system through a network.

S730: The in-vehicle system receives the feature query message, and determines a measured value and a matching parameter of the attribute feature of the reference object.

In a specific implementation, after receiving the feature query message through the network, the in-vehicle system may parse the feature query message according to the communications protocol, to extract the identification information of each fourth reference object and the at least one to-be-reported attribute feature corresponding to each fourth reference object that are included in the feature query message.

Then, the in-vehicle system may detect or measure each to-be-reported attribute feature of each fourth reference object by using a sensing apparatus such as a camera or radar installed on a vehicle, to obtain a measured value of each to-be-reported attribute feature of each fourth reference object. Subsequently, the in-vehicle system may extract a reference value of each to-be-reported attribute feature of each fourth reference object from a database corresponding to a second map used by the in-vehicle system, and calculate a matching parameter of each to-be-reported attribute feature of each fourth reference object based on the measured value and the reference value of each reporting attribute feature of each fourth reference object. For a specific calculation process, refer to the process of calculating the matching parameter in step S610 in Embodiment 3. Details are not described herein again.

S740: The in-vehicle system generates a feature report message based on the attribute feature of the reference object and the matching parameter.

In a specific implementation, after obtaining the measured value and the matching parameter of each to-be-reported attribute feature of each fourth reference object, the in-vehicle system may generate, according to the communications protocol, the feature report message that includes the measured value and the matching parameter of each to-be-reported attribute feature of each fourth reference object.

S750: The in-vehicle system sends the feature report message to the map server.

In a specific implementation, after generating the feature report message, the in-vehicle system may send the feature report message to the map server through a network.

S760: The map server receives the feature report message, and updates a database based on the feature report message.

In a specific implementation, after receiving the feature report message through the network, the map server may parse the feature report message by using the communications protocol, to obtain the measured value and the matching parameter of each to-be-reported attribute feature of each fourth reference object. Then, the map server may update the measured value and the matching parameter that are of each to-be-reported attribute feature of each fourth reference object and that are stored in the database of the map server to the measured value and the matching parameter that are of each to-be-reported attribute feature of each fourth reference object and that are included in the feature report message. In this way, the database is updated.

In this embodiment of this application, the map server updates, based on the measured value and the matching parameter that are of the attribute feature of the reference object and that are reported by the in-vehicle system, the measured value and/or the matching parameter that are/is of the attribute feature of the reference object and that are/is stored in the database of the map server, so that authenticity and reliability of data that is in the database and that is associated with the reference object can be ensured.

Figure 8:
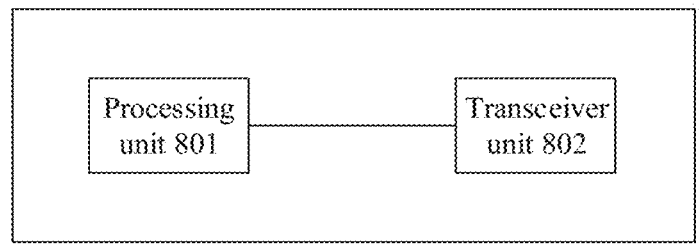
FIG. 8 is a structural block diagram of an apparatus according to an embodiment of this application.

FIG. 8 is a structural block diagram of an apparatus according to an embodiment of this application. The apparatus may be the server in Embodiment 1. As shown in FIG. 8, the apparatus includes:

a transceiver unit 802, configured to receive a first message from a first terminal device, where the first message includes first location information determined by the first terminal device; and a processing unit 801, configured to determine a first reference object based on the first location information, where the transceiver unit 802 is further configured to send a second message to the first terminal device, where the second message includes identification information of the first reference object, and the identification information of the first reference object is used by the first terminal device to update the first location information.

In some possible implementations, the processing unit 801 is specifically configured to: determine, based on the first location information, a second reference object from a first map currently used by the processing unit 801; and determine the first reference object from the second reference object based on a matching parameter of at least one attribute feature of the second reference object, where the matching parameter of the at least one attribute feature of the second reference object is stored in the server, and a matching parameter of any attribute feature is used to indicate a matching degree between a measured value of the any attribute feature and a reference value of the any attribute feature.

In some possible implementations, it is assumed that there are N2 second reference objects and N1 first reference objects. The processing unit 801 is configured to calculate, based on a matching parameter that is of each of at least one attribute feature of each of the N2 second reference objects and that is stored in the server, a combination matching parameter corresponding to each second reference object, where one second reference object corresponds to one combination matching parameter. The server determines the N1 first reference objects from the N2 second reference objects based on the combination matching parameter corresponding to each second reference object.

In some possible implementations, it is assumed that there are N2 second reference objects and N1 first reference objects. The processing unit 801 may be configured to determine, based on a matching parameter of each of at least one attribute feature of each of the N2 second reference objects, a combination matching parameter corresponding to each second reference object. Then, the server selects the N1 first reference objects from the N2 second reference objects based on the combination matching parameter corresponding to each second reference object and a measured value of at least one target attribute feature of each second reference object, where the target attribute feature may be determined based on one or more attribute features of each reference object.

In some possible implementations, the first message further includes a third reference object determined by the first terminal device based on the first location information and/or environment information of the first terminal device. The processing unit 801 is configured to determine the first reference object based on a second reference object and the third reference object, where the second reference object is determined by the processing unit 801 from a first map based on the first location information, and the first map is a map currently used by the server.

In some possible implementations, the first message further includes map version information of the first terminal device. The processing unit 801 is configured to determine the first reference object based on a second reference object and a third reference object, where the second reference object is determined by the processing unit 801 from a first map based on the first location information, and the first map is a map currently used by the processing unit 801; and the third reference object is determined by the processing unit 801 from a second map based on the first location information, and the second map is a map corresponding to the map version information.

In some possible implementations, the first message further includes map version information of the first terminal device. The processing unit 801 is configured to determine the first reference object from a second map based on the first location information, where the second map is a map corresponding to the map version information.

In some possible implementations, the first message further includes environment information of the first terminal device. The processing unit 801 is configured to determine the first reference object from a first map and the environment information based on the first location information, where the first map is a map currently used by the processing unit 801.

In some possible implementations, the second message further includes a measured value and/or a matching parameter of at least one attribute feature of the first reference object, and the measured value and/or the matching parameter of the at least one attribute feature of the first reference object are/is used by the first terminal device to update the first location information.

In some possible implementations, the transceiver unit 802 is further configured to receive a feature reporting message from a second terminal device, where the feature reporting message includes a measured value and/or a matching parameter of at least one attribute feature of a fourth reference object.

The processing unit 801 is further configured to update a stored measured value and/or a stored matching parameter of the at least one attribute feature of the fourth reference object based on the measured value and/or the matching parameter of the at least one attribute feature of the fourth reference object.

In some possible implementations, the transceiver unit 802 is further configured to send a feature query message to the second terminal device, where the feature query message includes the at least one attribute feature of the fourth reference object.

In some possible implementations, the feature query message further includes reporting manner indication information corresponding to each of the at least one attribute feature, and reporting manner indication information corresponding to any attribute feature is used to indicate a reporting manner of the any attribute feature.

In some possible implementations, the reporting manners include periodic reporting and aperiodic reporting. Optionally, a reporting manner corresponding to an attribute feature with a larger stability parameter is aperiodic reporting, and a reporting manner corresponding to an attribute feature with a smaller stability parameter is periodic reporting.

In possible implementations, the second message further includes application scope indication information, and the application scope indication information is used to indicate a preset geographical scope to which the second message is applicable.

In some possible implementations, the application scope indication information is determined by the server based on a load of the server. A heavier load of the server indicates a larger preset geographical scope to which the reference object configuration message indicated by target indication information determined by the server is applicable.

In a specific implementation, the transceiver unit 802 may first receive the first message from the first terminal device, and then trigger the processing unit 801 to generate, based on the first message, the second message including the first reference object. Then, the transceiver unit 802 may send the second message to the first terminal device. For a specific process, refer to the plurality of steps performed by the server in Embodiment 1. Details are not described herein again.

In this embodiment of this application, the server may select an applicable first reference object for the first terminal device based on the first location information of the first terminal device, and push the applicable first reference object to the first terminal device. In this way, the first terminal device may perform positioning by using the applicable first reference object, to avoid a problem of low positioning precision caused by performing positioning by using an inapplicable reference object such as a damaged or blocked reference object, so that positioning precision of the first terminal device can be improved.

An embodiment of this application further provides a computer readable medium. The computer readable medium stores a computer program, and the computer program is executed by a computer to implement the method or the steps performed by the server in Embodiment 1.

An embodiment of this application further provides a computer program product. The computer program product is executed by a computer to implement the method or the steps performed by the server in Embodiment 1.

Referring to FIG. 8, the apparatus may alternatively be the first terminal device in Embodiment 1. The apparatus includes:

a transceiver unit 802, configured to send a first message to a server, where the first message includes first location information determined by the first terminal device, where the transceiver unit 802 is further configured to receive a second message from the server, where the second message includes identification information of a first reference object, and the first reference object is determined by the server based on the first location information; and a processing unit 801, configured to update the first location information based on the identification information of the first reference object.

In some possible implementations, the first message further includes map version information of the first terminal device, and the map version information is used by the server to determine the first reference object.

In some possible implementations, the first message further includes a third reference object, the third reference object is determined by the first terminal device based on the first location information or environment information of the first terminal device, and the third reference object is used by the server to determine the first reference object.

In some possible implementations, the first message further includes environment information of the first terminal device, and the environment information is used by the server to determine the first reference object.

In some possible implementations, the second message further includes a measured value and/or a matching parameter of at least one attribute feature of the first reference object. The processing unit 801 is configured to: determine a fifth reference object based on the first reference object and the measured value and/or the matching parameter of the at least one attribute feature of the first reference object, and update the first location information based on the fifth reference object.

In a specific implementation, the transceiver unit 802 may first generate the first message including the first location information and send the first message to the server, and then the transceiver unit 802 may receive the second message including the first reference object determined by the server based on the first location information. Then, the processing unit 801 may update the first information based on the first reference object. For a specific process, refer to the plurality of steps performed by the first terminal device in Embodiment 1. Details are not described herein again.

In this embodiment of this application, the first terminal device may perform positioning by using an applicable first reference object selected by the server, to avoid a problem of low positioning precision caused by performing positioning by using an inapplicable reference object such as a damaged or blocked reference object, so that positioning precision of the first terminal device can be improved.

An embodiment of this application further provides a computer readable medium. The computer readable medium stores a computer program, and the computer program is executed by a computer to implement the method or the steps performed by the first terminal device in Embodiment 1.

An embodiment of this application further provides a computer program product. The computer program product is executed by a computer to implement the method or the steps performed by the first terminal device in Embodiment 1.

Referring to FIG. 8, the apparatus may alternatively be the second terminal device in Embodiment 1. The apparatus includes:
- a processing unit 801, configured to generate a feature reporting message, where the feature reporting message includes a measured value and/or a matching parameter of at least one attribute feature of a fourth reference object, a matching parameter of any attribute feature is used to indicate a matching degree between a measured value of the any attribute feature and a reference value of the any attribute feature, and the measured value and/or the matching parameter of the at least one attribute feature of the fourth reference object are/is used to update a measured value and/or a matching parameter that are/is of the at least one attribute feature of the fourth reference object and that are/is stored in a server; and
- a transceiver unit 802, configured to send the feature reporting message to the server.

In some possible implementations, the processing unit 801 is configured to:
- obtain a measured value of each of the at least one attribute feature of the fourth reference object; and
- calculate a matching parameter of each attribute feature based on the measured value of each attribute feature and a reference value of each attribute feature.

In some possible implementations, the transceiver unit 802 is further configured to:
- receive a feature query message from the server, where the feature query message includes the at least one attribute feature of the fourth reference object.

In some possible implementations, the feature query message further includes reporting manner indication information corresponding to each of the at least one attribute feature of the fourth reference object, and reporting manner indication information corresponding to any attribute feature is used to indicate a reporting manner of the any attribute feature.

In some possible implementations, the application scope indication information is determined by the server based on a load of the server. A heavier load of the server indicates a larger preset geographical scope to which the reference object configuration message indicated by target indication information determined by the server is applicable.

In a specific implementation, the processing unit 801 may first generate the feature reporting message, where the feature reporting message includes the measured value and/or the matching parameter of the at least one attribute feature of the fourth reference object. Then, the transceiver unit 802 may send the feature reporting message to the server. For a specific process, refer to the plurality of steps performed by the second terminal device in Embodiment 1. Details are not described herein again.

In this embodiment of this application, the second terminal device can send measured values and matching parameters of some attribute features of the reference object to the server by using the feature reporting message, so that the server can update, in a timely manner, a measured value and a reference value that are of the attribute feature of the reference object and that are stored in a database of the server. Therefore, reliability and applicability of the measured value and the reference value that are of the attribute feature of the reference object and that are stored in the server are ensured.

An embodiment of this application further provides a computer readable medium. The computer readable medium stores a computer program, and the computer program is executed by a computer to implement the method or the steps performed by second first terminal device in Embodiment 1.

An embodiment of this application further provides a computer program product. The computer program product is executed by a computer to implement the method or the steps performed by the second terminal device in Embodiment 1.

Figure 9:
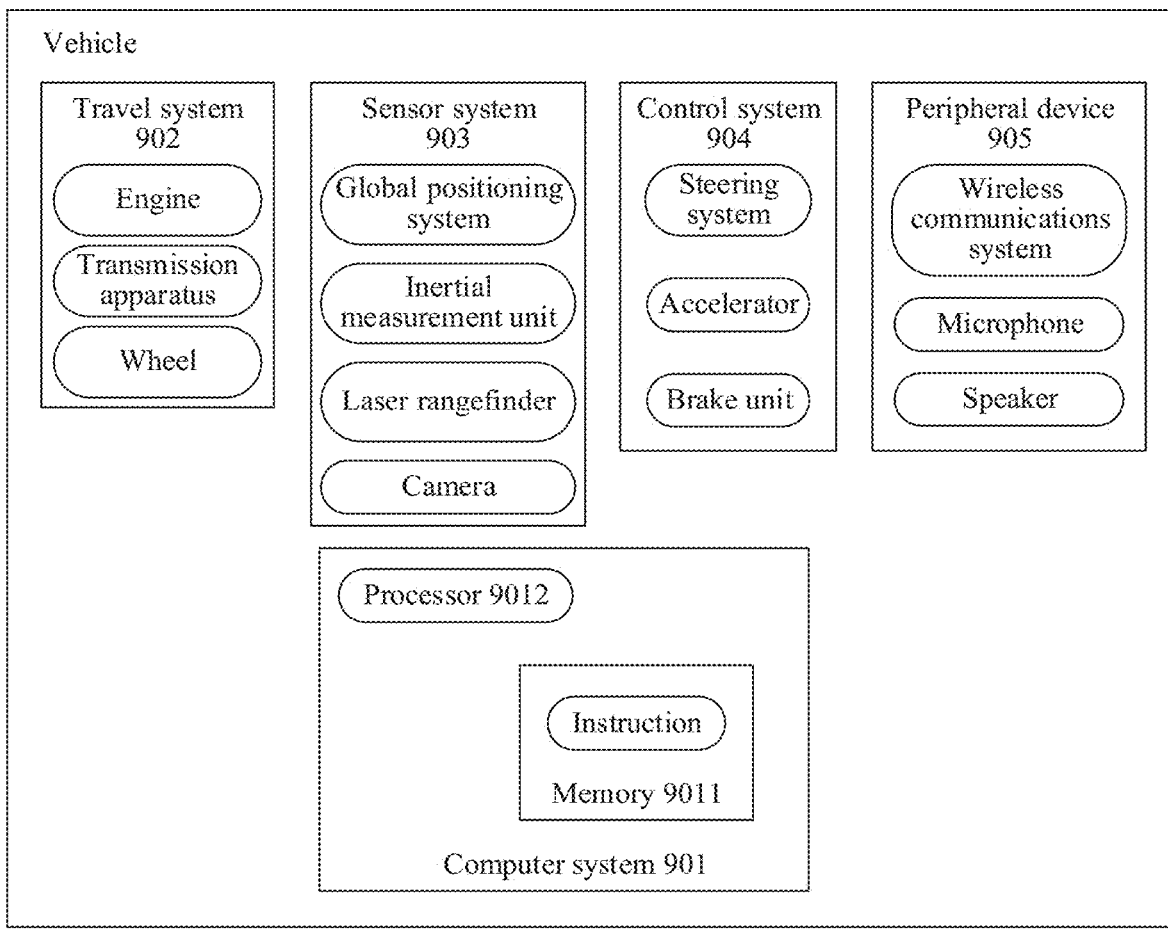
FIG. 9 is another structural block diagram of an apparatus according to an embodiment of this application.

FIG. 9 is another schematic structural diagram of an apparatus according to an embodiment of this application. The apparatus may be a vehicle, and a first terminal device may be implemented in a form of the apparatus. It can be learned from FIG. 9 that the apparatus includes various systems, for example, a travel system 902, a sensor system 903, a control system 904, one or more peripheral devices 905, and a computer system 901. Optionally, the apparatus may include more or fewer systems, and each system may include a plurality of elements. In addition, systems of the apparatus may be interconnected in a wired or wireless manner.

The travel system 902 may include a component that provides power for the apparatus to move. In an embodiment, the travel system 902 may include an engine, a transmission apparatus, a wheel/tire, and the like.

The sensor system 903 may include several sensors that sense information about an ambient environment of the apparatus. For example, the sensor system 903 may include a global positioning system (where the global positioning system may be a GPS system, a BeiDou system, or another positioning system), an inertial measurement unit, a laser rangefinder, and a camera. The sensor system 903 may further include sensors (for example, an air quality monitor, a fuel gauge, and an oil temperature gauge) in an internal system of the apparatus. One or more pieces of sensor data from these sensors may be used to detect an object and corresponding features (a location, a shape, a direction, a speed, and the like) of the object.

The control system 904 may control operations of the apparatus and the components of the apparatus. The control system 904 may include various elements, for example, may include a steering system, an accelerator, a brake unit, and the like.

The apparatus may further interact with an external sensor, another apparatus, another computer system, or a user by using the peripheral device 905. The peripheral device 905 may include a wireless communications system, a microphone, a speaker, and/or the like.

The computer control system includes a processor 9012 and a memory 9011. The processor 9012 may be any conventional processor, for example, a commercially available CPU. Optionally, the processor may alternatively be a dedicated device such as an ASIC or another hardware-based processor. Although FIG. 9 functionally illustrates other elements of the processor, the memory, and the computer system in a same block, a person of ordinary skill in the art should understand that the processor, the computer, or the memory may actually include a plurality of processors, computers, or memories that may or may not be stored in a same physical housing.

In some embodiments, the memory 9011 may include an instruction (for example, program logic), and the instruction may be executed by the processor 9012 to perform various functions of the apparatus, including the functions described above. The memory 9011 may also include additional instructions, including instructions used to send data to, receive data from, interact with, and/or control one or more of the travel system, the sensor system, the control system, and the peripheral device.

Optionally, the foregoing components are merely examples. In actual application, components in each system may be added or deleted based on an actual requirement. FIG. 9 should not be understood as a limitation on this embodiment of the present invention.

It should be noted that the processing unit 601 in FIG. 6 may be the computer system 901 in the apparatus, and the transceiver unit 602 may be the sensor system 903 and the wireless communications system in the apparatus.

In a specific implementation, when the foregoing systems cooperate with each other and enable the apparatus to be in a normal working state, the memory 9011 may store code corresponding to the positioning method performed by the first terminal device in Embodiment 1 and Embodiment 2. The processor 9012 may execute the code, to implement the steps in the positioning method performed by the first terminal device.

For example, the processor 9012 may receive first location information sent by the global positioning system in the sensor system, and generate a first message based on the first location information. The processor 9012 may send the first message to a map server by using the wireless communications system in the peripheral device 905. Then, the processor 9012 may receive, by using the wireless communications system, a second message sent by the map server. Subsequently, the processor 9012 may obtain a first reference object included in the second message, and update the first location information based on the first reference object.

Herein, for a process in which the processor 9012 executes the code to implement the steps in the positioning method performed by the first terminal device, refer to the descriptions in Embodiment 1 and Embodiment 2. Details are not described herein again.

Figure 10:
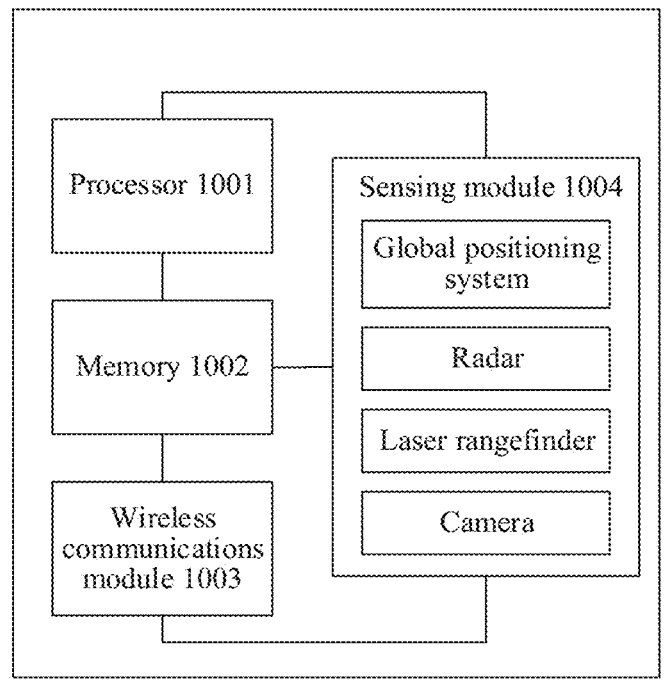
FIG. 10 is another structural block diagram of an apparatus according to an embodiment of this application.

FIG. 10 is another schematic structural diagram of an apparatus according to an embodiment of this application. The apparatus may be an in-vehicle system, and a first terminal device may alternatively be implemented in a form of the apparatus. The apparatus includes at least one processor 1001, at least one memory 1002, at least one wireless communications module 1003, and a sensing module 1004. The sensing module 1004 may include a plurality of sensor components, for example, a global positioning system, radar, a laser rangefinder, and a camera. This is not specifically limited herein. Herein, the processor 1001, the memory 1002, the wireless communications module 1003, and the sensing module 1004 are connected and communicate with each other through a communications bus or a communications interface.

It should be noted that a function of the processing unit 601 in FIG. 6 may be implemented by the processor 1001 and the memory 1002, and a function of the transceiver unit 602 may be implemented by the wireless communications module 1003 and the sensing module 1004.

In a specific implementation, the memory 1002 is configured to store application program code for performing the positioning method implemented by the first terminal device in Embodiment 1 or Embodiment 2, and the processor 1001 is configured to control execution of the code, to implement, by using the memory 1002, the wireless communications module 1003, and the sensing module 1004, various functions that need to be implemented by the first terminal device. For a specific process, refer to content of the steps performed by the first terminal device in Embodiment 1 or Embodiment 2. Details are not described herein again.

Figure 11:
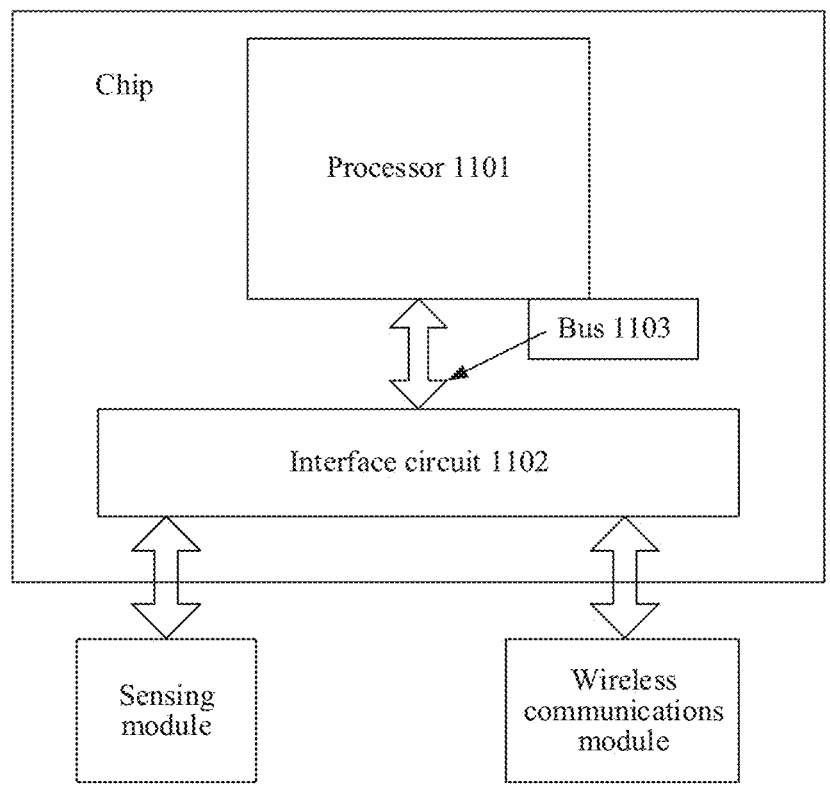
FIG. 11 is a structural block diagram of a chip according to an embodiment of this application.

FIG. 11 is a schematic structural diagram of a chip according to an embodiment of this application. A first terminal device may alternatively exist in a form of the chip. The chip may mainly include a processor 1101 and one or more interface circuits 1102 coupled to the processor 1101.

For example, the processor 1101 may be configured to: read and execute computer readable instructions. In a specific implementation, the processor 1101 may mainly include a controller, an arithmetic unit, and a register. For example, the controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and address conversion. The register is mainly responsible for storing a register operand, an intermediate operation result, and the like that are temporarily stored during instruction execution. In a specific implementation, a hardware architecture of the processor 1101 may be an application-specific integrated circuit (application specific integrated circuits, ASIC) architecture, a microprocessor without interlocked piped stages (microprocessor without interlocked piped stages architecture, MIPS) architecture, an advanced reduced instruction set computing machine (advanced RISC machines, ARM) architecture, an NP architecture, or the like. The processor 1101 may be a single-core or multi-core processor.

For example, the interface circuit 1102 may be configured to input to-be-processed data to the processor 1101, and may output a processing result of the processor 1101. In a specific implementation, the interface circuit 1102 may be a general-purpose input/output (general purpose input output, GPIO) interface, and may be connected to a plurality of peripheral devices (such as a wireless communications module and a sensing module). The interface circuit 1102 is connected to the processor 1101 through a bus 1103.

In a specific implementation, the processor 1101 may be configured to invoke, from a memory, code corresponding to the positioning method implemented by the first terminal device in Embodiment 1 or Embodiment 2, so that the chip can implement the steps in the positioning method implemented by the first terminal device in Embodiment 1 or Embodiment 2. The memory may be integrated into the processor 1101, or may be coupled to the chip through the interface circuit 1102. In other words, the memory may be a part of the chip, or may be independent of the chip. The interface circuit 1102 may be configured to output an execution result of the processor 1101. For example, in this application, the interface circuit 1102 may be specifically configured to output a second message determined by the processor 1101. For the positioning methods provided in the four embodiments of this application, refer to the foregoing embodiments. Details are not described herein again.

It should be noted that functions corresponding to each of the processor 1101 and the interface circuit 1102 may be implemented by using a hardware design, may be implemented by using a software design, or may be implemented by combining software and hardware. This is not limited herein.

Referring to FIG. 9, a second terminal device may also be implemented in a form of the apparatus, and specific content of the apparatus is not described herein again.

In a specific implementation, when the foregoing systems cooperate with each other and enable the apparatus to be in a normal working state, the memory 9011 may store code corresponding to the positioning method performed by the second terminal device in Embodiment 3 and Embodiment 4. The processor 9012 may execute the code, to implement the steps in the positioning method performed by the second terminal device.

For example, the processor 9012 may first receive, by using the wireless communications system, a feature query message sent by a server. Then, the processor 9012 may obtain a measured value of an attribute feature of a fourth reference object by using the sensor system 903, then calculate a matching parameter of the attribute feature of the fourth reference object, and generate a feature report message that includes the measured value and the matching parameter of the attribute feature of the fourth reference object. Then, the processor 9012 may send the feature report message to the server by using the wireless communications system in the peripheral device 905.

Herein, for a process in which the processor 9012 executes the code to implement the positioning method performed by the second terminal device, refer to the descriptions in Embodiment 3 or Embodiment 4. Details are not described herein again.

Referring to FIG. 10, a second terminal device may also be implemented in a form of the apparatus, and specific content of the apparatus is not described herein again.

In a specific implementation, the memory 1002 is configured to store application program code for performing the positioning method implemented by the second terminal device in Embodiment 3 or Embodiment 4, and the processor 1001 is configured to control execution of the code, to implement, by using the memory 1002, the wireless communications module 1003, and the sensing module 1004, various functions that need to be implemented by the second terminal device. For example, the wireless communications module 1003 may receive a feature query message sent by a server, and transmit the feature query message to the processor 1001. The processor 1001 may obtain, by using the sensing module, a measured value of an attribute feature of a fourth reference object, calculate a matching parameter of the attribute feature of the fourth reference object, and generate a feature report message. Then, the wireless communications module 1003 may send the feature report message to the server. For a specific process, refer to content of the steps performed by the second terminal device in Embodiment 3 or Embodiment 4. Details are not described herein again.

Referring to FIG. 11, a second terminal device may also be implemented in a form of the chip, and specific content of the chip is not described herein again.

In a specific implementation, the processor 1101 may be configured to invoke, from a memory, code corresponding to the positioning method implemented by the second terminal device in Embodiment 3 or Embodiment 4, so that the chip can implement the steps in the positioning method implemented by the second terminal device in Embodiment 3 or Embodiment 4.

For example, the wireless communications module may receive a feature query message sent by a server, and transmit the feature query message to the processor 1101 through the interface circuit 1102. The processor 1101 may obtain, from the sensing module through the interface circuit 1102, a measured value of an attribute feature of a fourth reference object detected by the sensing module, calculate a matching parameter of the attribute feature of the fourth reference object, and generate a feature report message. Then, the processor 1101 may send the feature report message to the wireless communications module through the interface circuit 1102. Finally, the wireless communications module may send the feature report message to the server. For a specific process, refer to content of the steps performed by the second terminal device in Embodiment 3 or Embodiment 4. Details are not described herein again.

Figure 12:
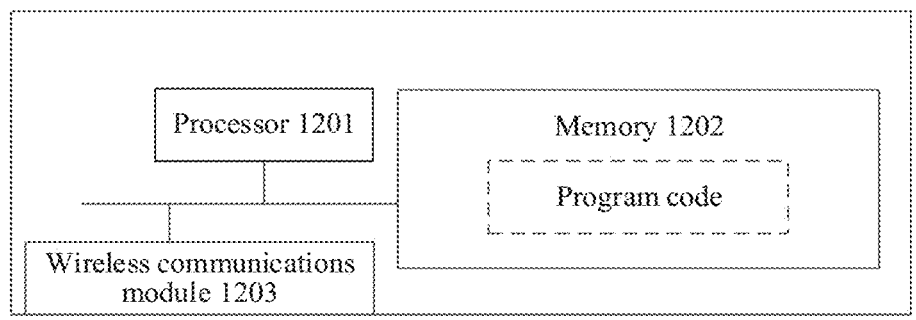
FIG. 12 is another structural block diagram of an apparatus according to an embodiment of this application.

FIG. 12 is another schematic structural diagram of an apparatus according to an embodiment of this application. A server may be implemented in a form of the apparatus. The apparatus mainly includes at least one processor 1201, at least one memory 1202, and at least one wireless communications module 1203. The processor 1201, the memory 1202, and the wireless communications module 1203 are connected and communicate with each other through a communications bus or a communications interface.

The memory 1202 is configured to store program code for performing the positioning method implemented by the server in Embodiment 1, Embodiment 2, Embodiment 3, or Embodiment 4. The processor 1201 is configured to execute the program code stored in the memory 1202 to implement the positioning method performed by the server in Embodiment 1, Embodiment 2, Embodiment 3, or Embodiment 4. The wireless communications module 1203 is configured to: send a message to or receive a message from an apparatus (for example, a first terminal device or a second terminal device) other than the apparatus.

For example, the wireless communications module 1203 may receive a first message sent by the first terminal device. The processor 1201 may determine a first reference object based on first location information in the first message, and generate a second message. The wireless communications module 1203 sends the second message to the first terminal device. For details, refer to the corresponding content in Embodiment 1, Embodiment 2, Embodiment 3, or Embodiment 4. The details are not described herein again.

Figure 13:
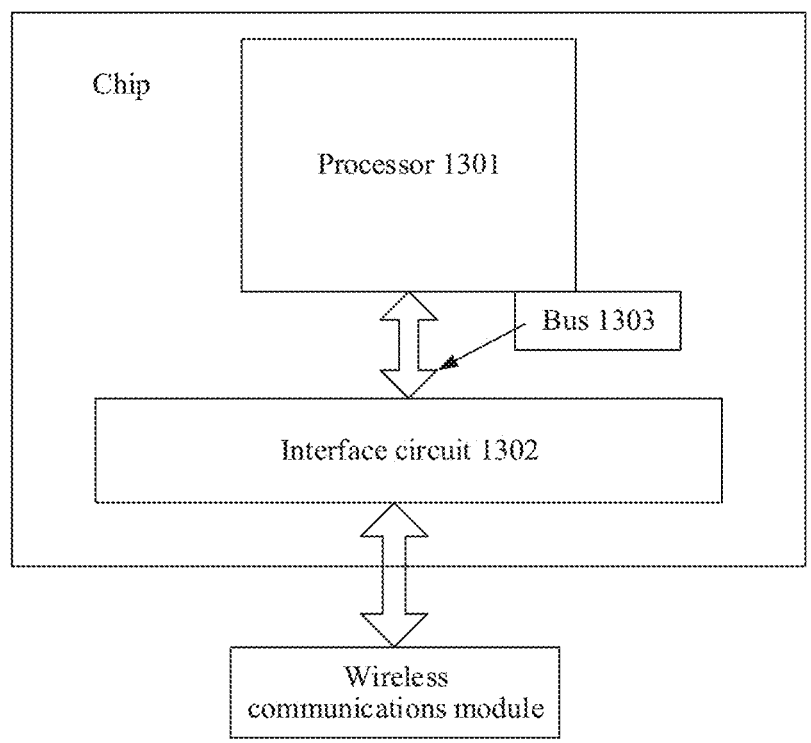
FIG. 13 is another structural block diagram of a chip according to an embodiment of this application.

FIG. 13 is another schematic structural diagram of a chip according to an embodiment of this application. A server may alternatively be implemented in a form of the chip. The chip may mainly include a processor 1301 and one or more interface circuits 1302 coupled to the processor 1301.

Herein, for an overview of functions of the processor 1301 and the interface circuit 1302, refer to the descriptions of the processor 1101 and the interface circuit 1102 in FIG. 11. Details are not described herein again.

In a specific implementation, the processor 1301 may be configured to invoke, from a memory, code corresponding to the positioning method implemented by the server in Embodiment 1, Embodiment 2, Embodiment 3, or Embodiment 4, so that the chip can implement the steps in the positioning method implemented by the server in Embodiment 1, Embodiment 2, Embodiment 3, or Embodiment 4. For example, the wireless communications module may receive a first message sent by a first terminal device, and transmit the first message to the processor 1301 through the interface circuit 1302. The processor 1301 may determine a first reference object based on first location information in the first message, and generate a second message. The processor 1301 may transmit the second message to the wireless communications module through the interface circuit 1302. Then, the wireless communications module may send the second message to a second terminal device. For details, refer to the corresponding content in Embodiment 1, Embodiment 2, Embodiment 3, or Embodiment 4. The details are not described herein again.

It should be noted that functions corresponding to each of the processor 1301 and the interface circuit 1302 may be implemented by using a hardware design, may be implemented by using a software design, or may be implemented by combining software and hardware. This is not limited herein.

In this embodiment of this application, the processor may be a general-purpose central processing unit (CPU), a microprocessor, an application-specific integrated circuit (application-specific integrated circuit, ASIC), or one or more integrated circuits for controlling program execution of the foregoing solution.

The memory may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that is accessible by a computer. However, the memory is not limited thereto. The memory may exist independently, and is connected to the processor through a bus. The memory may alternatively be integrated into the processor.

A transceiver may be an apparatus or a module that can implement communication with another device or a communications network, for example, a wireless communications module or a radio frequency module.

All or some of the foregoing method embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on the computer, the procedures or functions according to the embodiments of this application are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber Line, DSL)) or wireless (for example, infrared, radio, or microwave) manner. The computer readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid-state drive (solid state disk, SSD)), or the like.

It should be understood that terms "system" and "network" may be used interchangeably in the embodiments of this application. The term "and/or" in the embodiments describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, units, algorithms, and steps in the examples described with reference to the embodiments disclosed in this specification can be implemented by electronic hardware, computer software, or a combination thereof. To clearly describe interchangeability between the hardware and the software, the foregoing has generally described compositions and steps of the examples based on functions. Whether the functions are performed by hardware or software depends on particular applications and design constraints of the technical solutions. A person skilled in the art may use different methods to implement the described functions for each particular application, but it should not be considered that the implementation goes beyond the scope of this application.

In the embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

In addition, functional units in the embodiments of this application may be integrated into one processing unit, each of the units may exist alone physically, or two or more units may be integrated into one unit. The integrated unit may be implemented in a form of hardware, or may be implemented in a form of a software functional unit.

In conclusion, the foregoing descriptions are merely example embodiments of the technical solutions of this application, but are not intended to limit the protection scope of this application. Any modification, equivalent replacement, or improvement made without departing from the spirit and principle of this application shall fall within the protection scope of this application.

What is claimed is:

1. A positioning method, wherein the method comprises:
receiving, by a server, a first message from a first terminal device, wherein the first message comprises first location information determined by the first terminal device, and the first message is generated by the first terminal device to request the server to provide a reference object around the first terminal device;
determining, by the server, a first reference object based on the first location information; and
sending, by the server, a second message to the first terminal device, wherein the second message comprises identification information of the first reference object, and the identification information of the first reference object is used by the first terminal device to update the first location information.

2. The method according to claim 1, wherein the determining, by the server, a first reference object based on the first location information comprises:
determining, by the server based on the first location information, a second reference object from a first map currently used by the server; and
determining, by the server, the first reference object from the second reference object based on a matching parameter of at least one attribute feature of the second reference object, wherein the matching parameter of the at least one attribute feature of the second reference object is stored in the server, and the matching parameter of the attribute feature is used to indicate a matching degree between a measured value of the attribute feature and a reference value of the attribute feature.

3. The method according to claim 2, wherein the method further comprises:
receiving, by the server, a feature reporting message from a second terminal device, wherein the feature reporting message comprises at least one of a measured value or a matching parameter of at least one attribute feature of a fourth reference object; and
updating, by the server, at least one of a stored measured value or a stored matching parameter of the at least one attribute feature of the fourth reference object based on the at least one of the measured value or the matching parameter of the at least one attribute feature of the fourth reference object.

4. The method according to claim 3, wherein before the receiving, by the server, a feature reporting message from a second terminal device, the method further comprises:
sending, by the server, a feature query message to the second terminal device, wherein the feature query message comprises the at least one attribute feature of the fourth reference object.

5. The method according to claim 4, wherein the feature query message further comprises reporting manner indication information corresponding to each of the at least one attribute feature, and the reporting manner indication information corresponding to the attribute feature is used to indicate a reporting manner of the attribute feature.

6. The method according to claim 1, wherein the first message further comprises a third reference object determined by the first terminal device based on at least one of the first location information or environment information of the first terminal device, and wherein the determining, by the server, a first reference object based on the first location information comprises:
determining, by the server, the first reference object based on a second reference object and the third reference object, wherein the second reference object is determined by the server from a first map based on the first location information, and the first map is a map currently used by the server.

7. The method according to claim 1, wherein the first message further comprises map version information of the first terminal device, and wherein the determining, by the server, a first reference object based on the first location information comprises:
determining, by the server, the first reference object based on a second reference object and a third reference object, wherein the second reference object is determined by the server from a first map based on the first location information, the first map is a map currently used by the server, the third reference object is determined by the server from a second map based on the first location information, and the second map is a map corresponding to the map version information.

8. The method according to claim 1, wherein the first message further comprises map version information of the first terminal device, and wherein the determining, by the server, a first reference object based on the first location information comprises:
determining, by the server, the first reference object from a second map based on the first location information, wherein the second map is a map corresponding to the map version information.

9. The method according to claim 1, wherein the first message further comprises environment information of the first terminal device, and wherein the determining, by the server, a first reference object based on the first location information comprises:
determining, by the server, the first reference object from a first map and the environment information based on the first location information, wherein the first map is a map currently used by the server.

10. The method according to claim 1, wherein the second message further comprises at least one of a measured value or a matching parameter of at least one attribute feature of the first reference object, and the at least one of the measured value or the matching parameter of the at least one attribute feature of the first reference object is used by the first terminal device to update the first location information.

11. The method according to claim 1, wherein the second message further comprises application scope indication information, and the application scope indication information is used to indicate a preset geographical scope to which the second message is applicable.

12. A positioning method, wherein the method comprises:
sending, by a first terminal device, a first message to a server, wherein the first message comprises first location information of the first terminal device, and the first message is generated by the first terminal device to request the server to provide a reference object around the first terminal device;
receiving, by the first terminal device, a second message from the server, wherein the second message comprises identification information of a first reference object, and the first reference object is determined by the server based on the first location information; and
updating, by the first terminal device, the first location information based on the identification information of the first reference object.

13. The method according to claim 12, wherein the first message further comprises map version information of the first terminal device, and the map version information is used by the server to determine the first reference object.

14. The method according to claim 12, wherein the first message further comprises a third reference object, the third reference object is determined by the first terminal device based on the first location information or environment information of the first terminal device, and the third reference object is used by the server to determine the first reference object.

15. The method according to claim 12, wherein the first message further comprises environment information of the first terminal device, and the environment information is used by the server to determine the first reference object.

16. The method according to claim 12, wherein the second message further comprises at least one of a measured value or a matching parameter of at least one attribute feature of the first reference object, and wherein the updating, by the first terminal device, the first location information based on the identification information of the first reference object comprises:
determining, by the first terminal device, a fifth reference object based on the first reference object and the at least one of the measured value or the matching parameter of the at least one attribute feature of the first reference object; and
updating, by the first terminal device, the first location information based on the fifth reference object.

17. An apparatus, wherein the apparatus is a server, and the apparatus comprises:
a transceiver, the transceiver configured to receive a first message from a first terminal device, wherein the first message comprises first location information determined by the first terminal device, and the first message is generated by the first terminal device to request the server to provide a reference object around the first terminal device;
at least one processor; and
one or more memories coupled to the at least one processor and storing programming instructions for execution by the at least one processor to determine a first reference object based on the first location information, wherein:
the transceiver is further configured to send a second message to the first terminal device, wherein the second message comprises identification information of the first reference object, and the identification information of the first reference object is used by the first terminal device to update the first location information.

18. The apparatus according to claim 17, wherein the programming instructions are for execution by the at least one processor to:
determine, based on the first location information, a second reference object from a first map currently used by the processor; and
determine the first reference object from the second reference object based on a matching parameter of at least one attribute feature of the second reference object, wherein the matching parameter of the at least one attribute feature of the second reference object is stored in the apparatus, and the matching parameter of the attribute feature is used to indicate a matching degree between a measured value of the attribute feature and a reference value of the attribute feature.

19. The apparatus according to claim 18, wherein the transceiver is further configured to:
receive a feature reporting message from a second terminal device, wherein the feature reporting message comprises at least one of a measured value or a matching parameter of at least one attribute feature of a fourth reference object; and
wherein the programming instructions are for execution by the at least one processor to:
update at least one of a stored measured value or a stored matching parameter of the at least one attribute feature of the fourth reference object based on the at least one of the measured value or the matching parameter of the at least one attribute feature of the fourth reference object.

20. The apparatus according to claim 19, wherein the transceiver is further configured to:
send a feature query message to the second terminal device, wherein the feature query message comprises the at least one attribute feature of the fourth reference object.

21. The apparatus according to claim 20, wherein the feature query message further comprises reporting manner indication information corresponding to each of the at least one attribute feature, and the reporting manner indication information corresponding to the attribute feature is used to indicate a reporting manner of the attribute feature.

22. The apparatus according to claim 17, wherein the first message further comprises a third reference object determined by the first terminal device based on at least one of the first location information or environment information of the first terminal device, and wherein the programming instructions are for execution by the at least one processor to:
determine the first reference object based on a second reference object and the third reference object, wherein the second reference object is determined by the processor from a first map based on the first location information, and the first map is a map currently used by the apparatus.

23. The apparatus according to claim 17, wherein the first message further comprises map version information of the first terminal device, and wherein the programming instructions are for execution by the at least one processor to:

determine the first reference object based on a second reference object and a third reference object, wherein the second reference object is determined by the processor from a first map based on the first location information, the first map is a map currently used by the processor, the third reference object is determined by the processor from a second map based on the first location information, and the second map is a map corresponding to the map version information.

24. The apparatus according to claim 17, wherein the first message further comprises map version information of the first terminal device, and wherein the programming instructions are for execution by the at least one processor to:

determine the first reference object from a second map based on the first location information, wherein the second map is a map corresponding to the map version information.

25. The apparatus according to claim 17, wherein the first message further comprises environment information of the first terminal device, and wherein the programming instructions are for execution by the at least one processor to:

determine the first reference object from a first map and the environment information based on the first location information, wherein the first map is a map currently used by the processor.

26. The apparatus according to claim 17, wherein the second message further comprises at least one of a measured value or a matching parameter of at least one attribute feature of the first reference object, and the at least one of the measured value or the matching parameter of the at least one attribute feature of the first reference object is used by the first terminal device to update the first location information.

27. The apparatus according to claim 17, wherein the second message further comprises application scope indication information, and the application scope indication information is used to indicate a preset geographical scope to which the second message is applicable.

28. An apparatus, wherein the apparatus is a first terminal device, and the apparatus comprises:

a transceiver, the transceiver configured to:

send a first message to a server, wherein the first message comprises first location information of the apparatus, and the first message is generated by the first terminal device to request the server to provide a reference object around the first terminal device; and receive a second message from the server, wherein the second message comprises identification information of a first reference object, and the first reference object is determined by the server based on the first location information;

at least one processor; and one or more memories coupled to the at least one processor and storing programming instructions for execution by the at least one processor to update the first location information based on the identification information of the first reference object.

29. The apparatus according to claim 28, wherein the first message further comprises map version information of the apparatus, and the map version information is used by the server to determine the first reference object.

30. The apparatus according to claim 28, wherein the first message further comprises a third reference object, the third reference object is determined by the apparatus based on the first location information or environment information of the apparatus, and the third reference object is used by the server to determine the first reference object.

\* \* \* \* \*